(12) United States Patent
Paoluccio

(10) Patent No.: US 7,942,942 B2
(45) Date of Patent: May 17, 2011

(54) METHOD AND APPARATUS FOR BIOMASS TORREFACTION, MANUFACTURING A STORABLE FUEL FROM BIOMASS AND PRODUCING OFFSETS FOR THE COMBUSTION PRODUCTS OF FOSSIL FUELS AND A COMBUSTIBLE ARTICLE OF MANUFACTURE

(76) Inventor: John A. Paoluccio, Modesto, CA (US)

( * ) Notice: Subject to any disclaimer, the term of this patent is extended or adjusted under 35 U.S.C. 154(b) by 990 days.

(21) Appl. No.: 11/618,868

(22) Filed: Dec. 31, 2006

(65) Prior Publication Data

US 2007/0266623 A1  Nov. 22, 2007

Related U.S. Application Data

(60) Provisional application No. 60/747,803, filed on May 21, 2006.

(51) Int. Cl.
  *C10L 5/00* (2006.01)
  *C10L 5/44* (2006.01)
(52) U.S. Cl. .............. 44/605; 44/589; 44/590; 44/606; 44/629
(58) Field of Classification Search ............ 44/629, 44/589, 590, 605, 606
See application file for complete search history.

(56) References Cited

U.S. PATENT DOCUMENTS

| 4,553,978 | A | * | 11/1985 | Yvan | 44/280 |
| 4,787,917 | A | * | 11/1988 | Leclerc de Bussy | 44/606 |
| 2005/0284618 | A1 | * | 12/2005 | McGrevy | 165/156 |
| 2006/0096163 | A1 | * | 5/2006 | Dickinson et al. | 44/552 |

FOREIGN PATENT DOCUMENTS

WO  WO 2005/056723  *  6/2005

* cited by examiner

*Primary Examiner* — Ellen M McAvoy
*Assistant Examiner* — Latosha Hines
(74) *Attorney, Agent, or Firm* — Robert S. Smith

(57) ABSTRACT

Apparatus for biomass torrefaction which includes a serpentine elongated housing, the housing having three generally U-shaped axial portions having first and second axial extremities and an intermediate section, the first and second axial extremities are disposed in normal use at a higher elevation than the first and second axial extremities, the intermediate section being configured for holding a liquid. Other forms of the invention include the method for biomass torrefaction which includes providing a quantity of biomass, providing a liquid heat transfer fluid, providing at least a first housing for holding the heat transfer liquid, elevating the temperature of the liquid heat transfer liquid, heat treating the biomass by passing it through the heat transfer liquid in the first housing at a temperature and duration sufficient to accomplish torrefaction of the wood. In some forms of the method, the process further includes the step of pelletizing the biomass prior to performing the treating step.

26 Claims, 12 Drawing Sheets

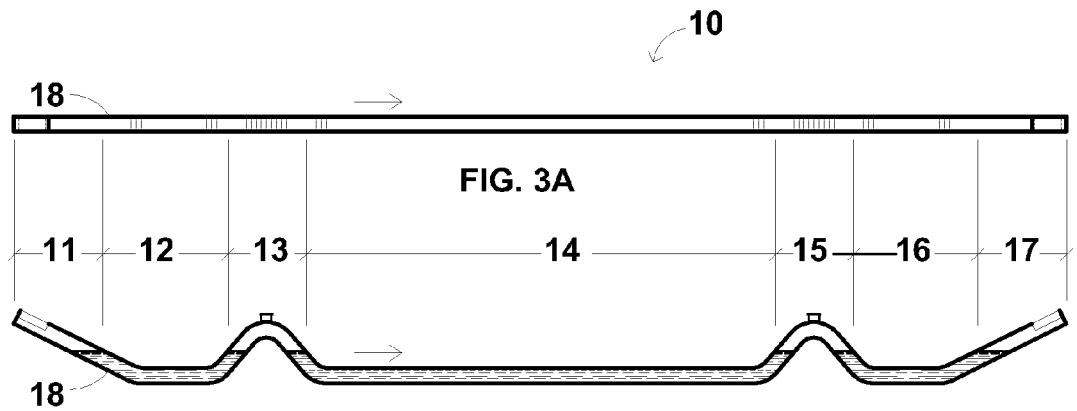
FIG. 3A
FIG. 3B
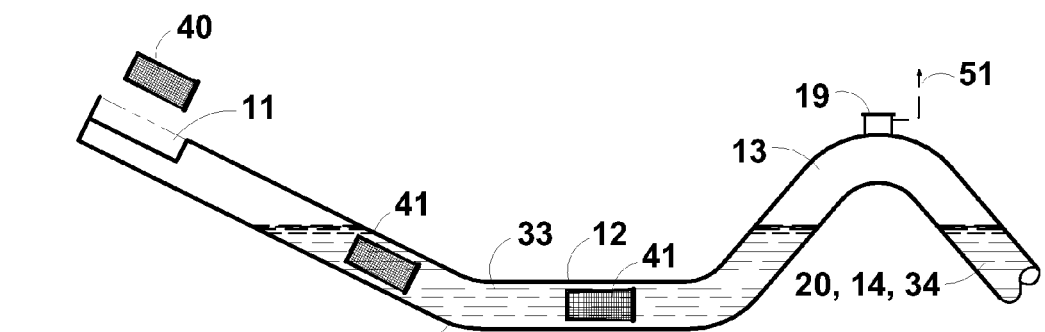
FIG. 3C
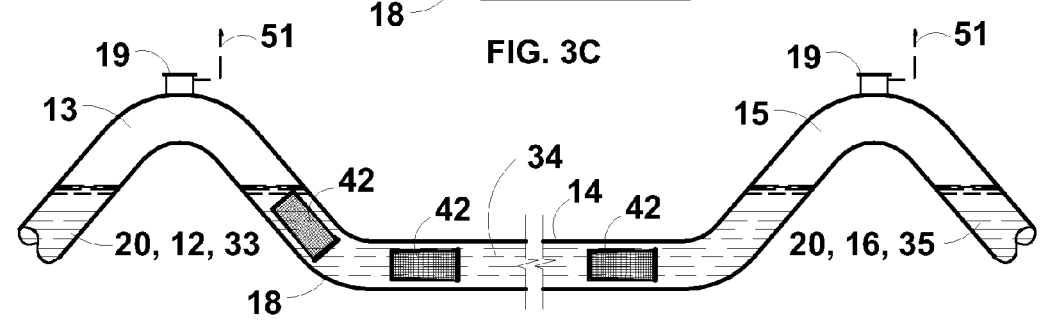
FIG. 3D
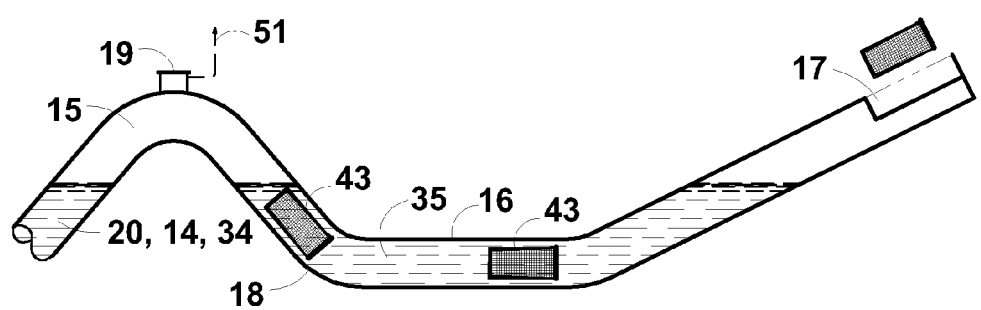
FIG. 3E

METHOD AND APPARATUS FOR BIOMASS TORREFACTION, MANUFACTURING A STORABLE FUEL FROM BIOMASS AND PRODUCING OFFSETS FOR THE COMBUSTION PRODUCTS OF FOSSIL FUELS AND A COMBUSTIBLE ARTICLE OF MANUFACTURE

RELATED APPLICATIONS

This application is a continuation in part of provisional United States provisional application 60/747803, filed May 21, 2006 entitled Method and Apparatus for Biomass Torrefaction and Manufacturing a Storable Fuel from Biomass.

BACKGROUND OF THE INVENTION

The invention relates to methods and apparatus for producing a combustible fuel, torrefaction of biomass, producing carbon dioxide offsets as well as an article of manufacture. Carbon-offset programs are the latest rage. Various entities have promised to mitigate greenhouse gas emissions from diverse activities. Europe established a cap-and-trade system last year that limits carbon dioxide emissions from about 50 percent of industry to reach its emissions goals as dictated by the Kyoto Protocol. Officials modeled the system on the sulfur dioxide trading market established in the U.S. in 1995, which has successfully cut levels of acid rain. As the trading market evolves, some environmentalists think that voluntary offset programs could join existing cap-and-trade market schemes to cut emissions even more substantially.

The need for an immediate solution to replace our depleting and air polluting fossil fuel energy sources is of the utmost importance. The increase in the use of non-renewable coal and oil requires an immediate replacement fuel to prevent severe economic, health and social problems. One solution is renewable solar energy that replaces the use of coal in electric power generating plants. This approach has not been widely utilized.

Fossil Fuel use for electric power plants, heat energy and transportation is continuing to increase at an alarming rate. Coal fired power plants use most of the coal and produce most of the fossil fuel air pollution. For each ton of carbon burned, 3.67 tons of carbon dioxide is generated. The global use of carbon emissions are over 7 billion tons per year and is expected to reach 14 billion tons per year by 2050.

The concentration of carbon dioxide in our atmosphere has increased over 35% since the late 18th century. The level is now at 379 parts per million by volume and climbing. Estimated increases in the last year are alarming.

Many scientists believe that it will take a joint effort in many areas with many new, yet to be invented, technologies to simply hold the concentration of carbon dioxide to present levels. One recent example of some ideas was recently presented by industry and governments on Global Warming. These include these 7 steps (New York Times Nov. 30, 2006)

1. New inventions that can capture 90% of the carbon dioxide from 800 new billion-watt coal-burning power plants.

2. Build 880 new nuclear power plants in lieu of new coal power plants.

3. Increase auto efficiency for 2 billion cars from 30 to 60 miles per gallon.

4. Increase the use of wind power 80 fold and use that energy to make hydrogen fuel for cars.

5. Raise the efficiency of 1,600 full size power plants, that utilize energy locked in coal, from 40 to 60%.

6. Conservation—Cut 25% of electricity use in homes, offices and stores.

7. Increase solar generated electricity by 700 fold.

These are worthwhile goals, however, the cost to implement these technologies would be staggering and some of these technologies create new problems. The ultimate solution requires innovative technologies. Many scientists say the only real long term prospect for significantly substituting for fossil fuels is a breakthrough in harvesting solar power.

Fossil fuels with their very high carbon content, are the predominate fuels today. They have been relatively easy to extract from the earth and to use with minimum processing and have a high heat content. It has only been in recent years has the negative impact of using this "Non-Renewable Fossil Fuel" on such a large scale that the negative impact to our environment has been fully recognized. In addition, fossil fuels are being depleted at an alarming rate and alternative energy resources must be found to fuel the world. Throughout the world all nations are facing the challenge of developing clean solar "Renewable Energy Fuels" to replace coal and other fossil fuels. Nuclear and other promising energy sources are at best many decades away from being practical on a large scale basis.

Carbonized wood and charcoal have long been known as high quality fuels that produce high energy and little smoke, however, they are costly to produce. Wood has returned as one of the fuels of choice out of necessity, but its moisture content along with the smoke and volatile organic compounds given off during burning have limited its use. With the necessary increase in the use of wood even with its air pollution burning problems, it is being used more and more today. Collecting and transporting wood having a low density such as 10 to 15 pounds per cubic foot has been solved with newer and better technologies that include chipping, shredding, milling and pelletizing where the wood is converted into practical pellet forms with a density of 40 plus pounds per cubic foot. This has opened new opportunities to further improve the burning properties of wood as a more practical replacement for fossil fuel.

Over the last 25 years an improved fuel source using wood that has been heated in the absence of oxygen has received considerable attention. This treated wood is called torrefied wood (TW). Numerous attempts have been made to produce this high energy, low pollution fuel with very limited success. Even with all the various methods considered, none has been practical. Even though coal fired electric power plants have found that using some torrefied wood mixed with coal greatly reduces the air pollution generated, the high cost of producing consistent quality torrefied wood simply does not exist with all prior art methods of production.

Wood has been used as a fuel for thousands of years. Wet wood may contain over 50% water. When burned, incomplete combustion occurs and it uses most of its energy to turn the water into steam and produces considerable smoke and thousands of forms of noxious gasses. Dry wood, as used in many fireplaces, may contain approximately 22 percent moisture. For any specific wood being burned, the dryer the wood being burned, the more complete the combustion. Dry wood burns cleaner than wet wood, but incomplete combustion still occurs, resulting in the formation of carbon monoxide and many volatile organic compounds and other undesirable air polluting gases. The pollution levels produced are unacceptable for most air pollution agencies. Some agencies are banning wood burning but accepting the use of wood pellets in special heaters because wood pellets typically contain less moisture (approximately 10%). However, a substantial amount of volatile organic compounds still exists in very dry wood. When wood pellets formed from dry wood are burned they can generate nitrogen oxides and other greenhouse gases and smog.

Carbonized wood is a three thousand year old technology that has been looked at to help replace coal. However, the process is inefficient because, in part, it consumes too much energy. A very promising improvement in technology was developed in the 1980's by the French when they commercially converted wood into torrefied wood. Torrefied wood has the moisture and most volatile organic compounds (VOC's) driven out resulting in a high percentage of carbon content. In addition, the chemistry and structure of the wood itself is converted into a new form by continued exposure to heat. The French process used heat treatment by an inert gas to drive out the unwanted moisture and volatile organic compounds and stopped the process before it became carbonized. The torrefied wood burned clean but production costs were high along with a complex system with high potential for fires that prevented this from practical commercial use.

Several inventions since have tried to perfect and improve the torrefaction process by using high pressure steam, high temperature inert gas, superheated steam and other gas, pressure and vacuum methods. Some of these technologies claimed to improve efficiencies but all have failed to overcome the practical conversion of wood into torrefied wood in a simple, easy, quick, practical, safe, uniform and economic way. What these prior technologies accomplished was demonstration projects that showed how using torrefied wood in co-firing with coal could result in cleaner burning with less air pollution generated. Again, all prior art methods have been too complex, too expensive, and have not been practical for commercial use.

A number of prior art methods exist for producing torrefied wood. These methods all use inert gas, high pressure steam, or superheated steam in the heat treatment process. These prior art methods primarily use convection heat transfer between the wood surface and the heat source such as a steam or inert gas medium. Using any type of inert gas or steam involves large containment systems with large amounts of surface area, high equipment costs, high energy costs, slow treatment rates, and low overall operating efficiencies with resultant high production costs. Maintaining an oxygen free inert gas environment to these systems adds to the complexity and costs.

With all these prior art methods the systems and equipment has to be complex and large to contain the inert gas or stream heat transfer medium. The high operating pressures required with steam, sometimes over 600 psi, require heavyweight materials for construction of the equipment utilized and typically utilize batch processes rather than continuous processes. These convection batch systems are inefficient and costly to perform, thus, the final product produced by such convection systems is expensive.

The torrefied wood produced in all prior art methods does not contain the heat transfer fluid (HTF) of this invention. Thus, the heat content is less at about 8,000 to 9,000 Btu per pound.

Even though torrefied wood works extremely well, as a fuel in co-firing with coal to reduce pollution, very little has been produced due to the overall processing inefficiencies and high costs of all prior art systems.

Torrefied Wood Properties

Torrefaction produces a high quality fuel from wood with a faster combustion rate, less smoking and hydrophobic characteristics. Torrefied wood is very resistant to moisture and decay and is friable. It can be ground and used with coal in co-firing to obtain less air pollution.

Torrefaction of wood, prior art technologies, include convection heating with direct contact with inert gas as the heating medium or indirect contact with steam. Retorts, pressure chambers, kilns and rotary drums are used to contain the wood and inert gas. Temperatures in the range of 240° C. to 280° C. (464 F to 536 F) are typical. Pressures range from atmospheric to that of high pressure steam at 600 psi or more. Exposure times vary widely and may be 1 to 3 hours. Under high pressure steam with the higher temperatures, the torrefaction time can be reduced to less than an hour. Small wood pieces can be torrefied faster than large pieces.

Temperature considerations inherent in the process include: Wood exposed to less than 200° C. (392° F.) result in water evaporation where the wood is dehydrated. Little or no combustible products are formed. Therefore, using a heat transfer fluid at a temperature of approximately 350° F. is reasonable for pre-heating the wood, in a manner that prevent combustion from occurring, before the wood enters the heat treatment section 14.

When wood is heated to 160° C. (320° F.) it loses water and very little else. It also retains its physical mechanical properties and remains hygroscopic. When wood is exposed to 180° C. to 280° C. (or 355° F. to 536° F.) it gives off moisture, carbon dioxide, and large amounts of acetic acid and VOC's. Complex endothermic reactions occur during this 355° F. to 536° F. heating period along with changes to the physical and chemical properties including the wood becoming more friable and hydrophobic. Torrefaction is achieved during this high temperature heating process where the moisture content is reduced to 3% or less, the mass is reduced by approximately 30%, retention of 90% of the original energy and removal of most smoke producing agents. These temperatures, moisture removal percentage and exposure times vary with the type and density of biomass material being torrefied.

When wood is heated to above 280° C. (or 536° F.) the reactions become exothermic and the wood starts to be gasified instead of being torrefied. When gasification occurs the wood is transformed into combustible gasses including methane, carbon monoxide, hydrogen and tars. Wood is gasified for certain purposes but this is not desired for torrefaction as described herein.

Prior art temperatures of 250° C. to 270° C. (482° F.-518° F.) are the standard with "convection" heating. The higher the temperature the faster the wood is torrefied. Smaller particles, such as pellets, can be torrefied faster than large particles such as briquettes.

Switchgrass—General Information on One Potential Energy Crop

Almost any biomass can be used as a fuel source, however, switchgrass has many advantages that make it an ideal material to consider with this invention.

Many years ago, switchgrass dominated the vast prairies of the United States. The industrial revolution, fossil fuel use and agricultural use of the land ended the dominant role of switchgrass as a carbon dioxide and energy storage sink. Switchgrass stands about 10 feet tall and grows in most areas. It needs little water and can produce over 10 tons of dry biomass fuel per acre.

Switchgrass can produce 185 GJ (175.5 MBtu or 175,000,000 Btu) of energy per 10 tons of biomass. Each acre of even marginal crop producing value can produce an average of 10 tons of switchgrass. Switchgrass has an energy output to input ratio of approximately 20:1. This makes it one of the highest net energy yields of any other practical biomass per acre.

Currently, state of the art switchgrass pellets have a very high net energy yield per acre as compared to other biomass forms. It has the highest energy output to input ratios, the greatest economic advantage over fossil fuels and the greatest potential to offset carbon dioxide from fossil fuels. When switchgrass pellets are substantially improved with this unique high temperature immersion torrefaction process and method of this invention, hereinafter referred to as "torrefied wood pellets" (TWP), they becomes a practical replacement or supplement for fossil fuel such as coal for use in electric power plants. Co-firing 15% torrefied wood pellets (TWP) to 85% coal has been successfully tested in a number of electric power plants that resulted in significant pollution reduction.

Switchgrass can be repetitively harvested over 10 years before re-planting is necessary. One third of the carbon dioxide collected by the plant is sequestered back into the soil by its root system that remains after harvesting.

When switchgrass is used as a pelleting material in existing mills a doubling of production occurs over hardwood and softwood sawdust.

BRIEF DESCRIPTION OF THE DRAWINGS

The invention will be better understood by reference to the accompanying drawings in which:

FIG. 3A is a plan view of the serpentine body 18 system.

FIG. 3B is an elevation view of the serpentine body 18 system with multiple sections separated by elevated axial sections 13,15.

FIG. 3C is a partial elevation view illustrating the loading of a capsule 40 into the inlet of the pipeline and the pre-heating 12 section and the elevated axial section 13.

FIG. 3D is a partial elevation view of the heat treatment section 14 and the elevated axial sections 13, 15.

FIG. 3E is a partial elevation view of the cooling 16 section and the capsule 40 with torrefied wood pellets (TWP) exiting the system.

FIG. 6B is the inlet 11 of the pre-heat 12 section and the heat transfer fluid 33 liquid level in the serpentine body 18. Water vapor 50 is shown exiting the inlet 11 exhaust system 51 at the hinged covers 11a.

Figure 1:
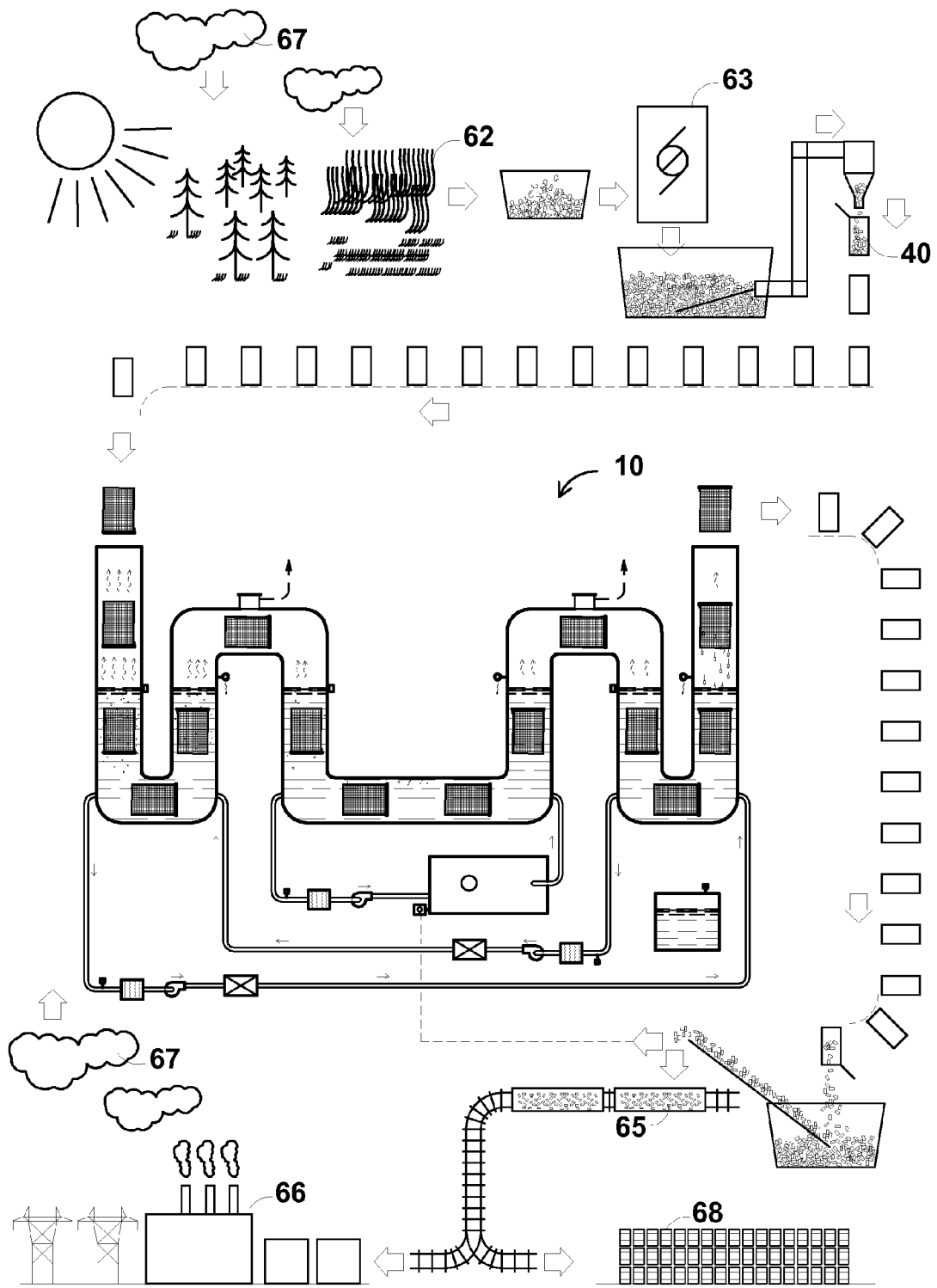
FIG. 1 is a diagrammatic view of the path wood would travel from biomass to a pellet mill and then to the process in accordance with the present invention where the wood is converted to torrefied wood pellets (TWP). The fully processed torrefied wood pellets (TWP) are diagrammatically illustrated as being distributed to electric power plants; to the heater for this process; and to storage facilities to be used as energy and pollution "offsets".

Curve A: This is the expected increase in $CO_2$ at the present rate of use of fossil fuels. During the last 200 to 300 years $CO_2$ has increased about 35% due to fossil fuel use. The rate is increasing rapidly as developing nations use more fossil fuels.

Curve B: This curve shows how the concentration could decrease if 50% of coal presently used was replaced with the torrefied wood product in accordance with the present invention in co-firing electric power generation plants.

Curve C: This curve shows how $CO_2$ concentrations would level off if 100% of the current coal use were offset by the torrefied wood product in accordance with the present invention on a pound per pound carbon basis.

Curve D: This curve shows how the $CO_2$ concentration would start to become lower and approach levels in the past if torrefied wood products in accordance with the present invention were used as offsets and used to replace coal in electric power generating plants. Torrefied wood pellets could also be used for home heating and stoves and many other uses that should be encouraged to bring our $CO_2$ level back to near normal levels before fossil fuel use.

Curve E: This shows the normal baseline $CO_2$ concentration since the year 1,000 AD as a reference line or goal to achieve in the future.

ADVANTAGES OF THE INVENTION

Various embodiments of the invention have some or all of the following advantages. A paramount advantage is the creation of a new and improved type of renewable energy fuel called torrefied wood pellets (TWP) made from treating wood pellets to replace or supplement non-renewable fossil fuel such as coal in order to reduce air pollution. The present invention turns wood into a pelletized form that is a near pollution free fuel with high carbon content that can withstand decay and decomposition from moisture, insects and microbes and can be easily transported and stored for hundreds of years.

The present invention finally allows for the safe, economical, practical production of turning wood into torrefied wood or enhanced torrefied wood for use as a fuel and for energy or pollution "Offsets". For greatest efficiency, the biomass should be collected, air dried and pelletized before it is delivered to the processing facility as described in this invention. The ideal forms of wood biomass is wood pellets, but wood briquettes and wood logs may also be used, however longer processing times would be required. All three of these biomass forms are readily available today. Lumber, logs and other forms of wood can also be used but the uniformity of pellets with higher density are preferred for continuous flow heat treatment operations.

The Immersion heat treatment as described in this invention can use biomass that has been collected and pelletized, and then convert it into torrefied wood pellets and the torrefied wood products in accordance with the present invention.

The following list some of the many benefits and advantages:

1. Waste wood and other normally unused biomass could be put to a practical use instead of being placed in landfills or incinerated or left to decay where it returns carbon dioxide, methane and other gasses to our air.

2. Farmers could put to use large areas of near worthless land and restore it to grow energy biomass crops for energy production.

3. Switch grass may be one of the most energy efficient biomass crops to grow for energy use. It may produce 2 to 3 times the energy of corn.

4. New industries could be formed to harvest, collect, chip, shred, mill, pelletize, and transport the biomass for production into the torrefied wood products in accordance with the present invention.

5. Millions of jobs could be generated throughout the world to man the growing, harvesting, collecting, transporting, milling, pelletizing, processing, distributing, managing and storage of torrefied wood products in accordance with the present invention for energy use and offsets.

6. The air we breathe would benefit from every pound of torrefied wood produced. When the goal of total carbon "offset" is achieved, in replacing fossil fuel, the concentration of carbon dioxide may stop increasing and actually start to decrease to a normal "natural" level of concentration. Then the level could be lowered to a more natural concentration level as in the past, 1800s.

7. The health of all life including people, animals, fish and plants would improve with a shift toward normalization of the carbon dioxide concentration level. Many other harmful fossil fuel gases and pollutants would also be eliminated from the environment along with "zero" added carbon dioxide due to "Renewable Energy" torrefied wood use as a side benefit.

8. Acid rain will be diminished, as coal use is diminished, as it causes crops and forests to die and causes lakes to turn baron of life.

9. Poor developing nations can utilize the teachings of this invention to move forward with modernizations and offset the greenhouse gases they produce. For example: This inventor made a recent trip to China to assist in the development of an egg processing plant. They used high sulfur containing coal to produce steam heat and electricity. The air was polluted for miles around and the air was thick with black smoke. Health problems of catastrophic proportion are occurring in many developing nations due to burning poor quality fossil fuels. The teachings of this invention would assist them in being better stewards of the land and move toward cleaner fuels and "Off-Sets" to replace fossil fuel use.

10. Recent air quality sampling tests conducted in multiple stations in California revealed that up to 25% of the air pollution can be traced to China and other overseas countries. The teachings of this invention can help these countries generate clean heat and energy and help curb global air pollution.

11. The health of all nations would improve in many ways. Science and the medical profession know very little about the long range effect of air pollution on living tissue. The term air pollution in this case refers to all the smoke, gases, dust, pollen, etc. that is frequently referred to as smog. They do know that certain debilitating medical problems result from long term exposure but the combination of pollutants is so complex that the long range impact to health is not very well known. What is known is that it is safer to avoid unnecessary exposure to these unnatural fossil fuel contaminants.

12. This invention can result in a tremendous increase in plant growth for specific production of biomass for the production of torrefied wood products in accordance with the present invention. Some nations may contract with the USA and other nations to grow certain crops, harvest it, and process it into torrefied wood products in accordance with the present invention for fuel or offsets. Some nations that grow plants for producing illegal drugs may instead grow plants for producing biomass for fuel in the form of torrefied wood products in accordance with the present invention. Society would benefit.

13. This invention would require more cropland, forests and plant growth. This would bring with it a resurgence of wildlife and natural habitats where endangered species could prosper. Many underdeveloped nations have decimated their woodlands by clear cutting, burning for conversion to farming and used most for fuel. The teachings of this invention can help restore these nations' forests and woodlands.

14. As more plants are grown, the carbon dioxide level will decrease. Plants act as air and water filters and extract harmful chemicals during growth. This invention alters our environment more toward a natural previous state.

15. Existing factories and industries that still use fossil fuels can apply for energy or pollution "offsets" when they plan on expanding their facility. The torrefied wood products in accordance with the present invention become a very practical means of allowing these facilities to expand and reduce the net amount of carbon dioxide entering our air. For example, a factory that needs to offset a certain value (X) of carbon equivalent offsets could purchase (X) amount of torrefied wood products in accordance with the present invention for long range storage. The added energy they would use in their expansion would equal the energy in the (X) amount of offsets purchased. In essence, for every pound of "Carbon" stored as an offset in the torrefied wood products in accordance with the present invention would equal one pound or "carbon" used in the fossil fuel burned, resulting in "Zero" net added pollution.

16. This invention provides the world with the only immediate practical solution to a clean energy fuel to replace fossil fuel coal on a large scale. If, for example torrefied wood pellets (TWP) were to replace only 1% of the coal used each year in existing electric power plants, the torrefied wood products in accordance with the present invention used would cover an area the size of a football field and be 4 miles high! Currently, over 7 billion tons of fossil fuel is burned each year. It is very difficult to comprehend the volume of carbon dioxide produced by its combustion.

17. This invention, in a preferred form, may be achieved with a relatively simple four (4) foot diameter serpentine or curvilinear tubular body. The body may, for example, have some physical similarity to the Alaskan pipeline.

18. Embodiments of the invention use a plant feedstock or petroleum derived heat transfer Paraffinic fluid that can be heated to 600° F. and still maintain a very low vapor pressure. This allows for near atmospheric operation of the entire pipeline system. This invention need only heat the fluid to less than 480° F. For example, the heat treatment portion of the invention may operate at several inches of water pressure at 450 F and the pre-heat and cooling sections at 300 F may operate at a pressure that is very close to ambient pressure so both the wood pellets entering and torrefied wood pellets leaving the system can safely be open to ambient air.

19. This high temperature heat transfer fluid allows for simple direct immersion "conduction" heat treatment of the wood in order to quickly convert it to torrefied wood. The treatment time may be reduced to minutes instead of hours as with some prior art methods.

20. Direct immersion heating in a liquid results in considerably faster heat transfer to occur as compared to inert gas or steam as in prior art systems. An example of convection and conduction can be better understood when comparing the sensation of heat one feels in the following: One can stand to be in a dry sauna at 180° F. for long periods of time that may be 2 hours (convection heating). One can stand to be in a steam room at 125 F for one half hour (convection heating). But, one can only stand to be in a hot tub at 110° F. for 5 or 10 minutes. The direct immersion in the hot tub is an example of conduction heating.

21. The need for special and expensive oxygen free gases to be supplied to the containment system is virtually eliminated due to the unique serpentine body design with elevated axial sections on each side of the heat treatment section.

22. The first costs, operating costs and total production costs of the entire equipment of this invention is a mere fraction of those of prior art. Therefore, torrefied wood pellets (TWP) can be produced at such low cost as to make its use extremely practical as a replacement or supplement to coal. The primary barrier to the practical use of torrefied wood pellets (TWP) in co-firing with coal has been the high cost and quality of torrefied wood pellets (TWP) production and this invention solves these problems.

23. Residual heat transfer fluid (HTF) that remains on or in the torrefied wood (TW) fibers is in itself a clean burning fuel and actually adds to the calorific value or the finished torrefied wood pellets (TWP) product. The heating level may increase 5 to 10% or more depending on the heat transfer fluid (HTF) used, the exposure time and type of biomass material used. Due to heat transfer fluid (HTF) costs, most is drained off of the torrefied wood pellets (TWP) and is reused in the system over and over. Algae and many plants such as soy, peanut, palm, and corn can produce oils, waxes or bio-fuels. Some, in combination may, if processed to a form that has a low vapor pressure at high temperatures, be used as a heat transfer fluid (HTF). Many synthetic, feedstock and petroleum sources of heat transfer fluid (HTF) can also be used.

24. As the teachings of this invention become known, other manufactures of high temperature heat transfer fluids will also develop other fluids that can be used. This competition should result in even lower operating costs and an improved final product.

25. As the teachings of this invention become known new agricultural, and genetic practices should lead to the development of energy crops that like switchgrass will yield more energy per acre and have improved properties for processing into torrefied wood.

26. The USA and the rest of the world will reduce its dependence on fossil fuels.

27. High quality fossil fuels are diminishing at a rapid rate. This invention can greatly extend existing supplies for future generations.

28. Coal is used more than any other fossil fuel. In addition, most coal is not of high quality. Desired coal has a high carbon content, low sulfur and low heavy metal content. This higher quality coal is becoming more difficult to find. More use of lower quality coal is being used and this requires more complex and costly air pollution controls. This invention can greatly reduce the use of the low quality coal.

SUMMARY OF THE INVENTION

It has now been found that these objects and advantages may be achieved in apparatus for biomass torrefaction which includes a serpentine elongated housing, the housing having at least a first generally U-shaped axial portion having first and second axial extremities and an intermediate section, the first and second axial extremities are disposed in normal use at a higher elevation than the first and second axial extremities, the intermediate section being configured for holding a liquid In some forms of the apparatus the serpentine elongated housing further includes a second generally U-shaped axial portion having first and second axial extremities and an intermediate section, the first and second axial extremities thereof is disposed in normal use at a higher elevation than the first and second axial extremities thereof. The intermediate section may be configured for holding a liquid, the second generally U-shaped axial portion may be coupled to the first generally U-shaped axial portion by a first elevated axial section of the housing whereby the first and second U-shaped axial portions are disposed in fluid communication. The serpentine elongated housing may further include a third generally U-shaped axial portion having first and second axial extremities and an intermediate section, the first and second axial extremities thereof may be disposed in normal use at a higher elevation than the first and second axial extremities thereof, the intermediate section may be configured for holding a liquid, the third generally U-shaped axial portion may be coupled to the second generally U-shaped axial portion by a second elevated axial section of the housing whereby the first, second and third U-shaped axial portions are disposed in fluid communication.

In some embodiments the first axial portion is a pre-heat portion, the second axial portion is a heat treatment section and the third axial section is a cooling section. The apparatus may also include vents in both the first and second elevated axial sections whereby moisture and volatile organic compounds can escape In various forms of the invention, the apparatus includes one or more wire mesh enclosures for containing biomass in a pellet form. This enclosure may be dimensioned and configured for passage through the serpentine elongated housing. The apparatus may also include a conveyor for serially moving wire mesh enclosures through the axial extent of the serpentine elongated housing and the conveyor may include elongated members joining respective wire mesh enclosures whereby a succession of alternating elongation members and wire mesh enclosures are joined together. The elongated members may each be a chain. Some forms of the apparatus include a heat recovery system for recovering heat added to an associated biomass may be heat-treated in the apparatus. Some forms of the apparatus include structure for raising the temperature of an associated heat transfer fluid within the second portion to a temperature in the range of 380 to 550° F.

Other forms of the invention include the method for biomass torrefaction which includes providing a quantity of biomass, providing a liquid heat transfer fluid, providing at least a first housing for holding the heat transfer liquid, elevating the temperature of the liquid heat transfer liquid, heat treating the biomass by passing it through the heat transfer liquid in the first housing at a temperature and duration sufficient to accomplish torrefaction of the wood. In some forms of the method, the process further includes the step of pelletizing the biomass prior to performing the treating step. The step of providing a liquid heat transfer fluid may include providing a heat transfer fluid that is combustible whereby residual heat transfer fluid entrained within and on the surface of the wood increases the energy output available when the treated wood is burned. The step of providing a first housing may includes providing a serpentine elongated first housing that has at least a first generally U-shaped axial portion having first and second axial extremities and an intermediate section, the first and second axial extremities are disposed in normal use at a higher elevation than the first and second axial extremities, and the intermediate section is configured for holding a liquid.

Similarly, the method may include a step of providing a first housing that further includes providing a housing that includes a second generally U-shaped axial portion having first and second axial extremities and an intermediate section and the first and second axial extremities thereof are disposed in normal use at a higher elevation than the first and second axial extremities thereof and the intermediate section is configured for holding a liquid and the second generally U-shaped axial portion is coupled to the first generally U-shaped axial portion by a first elevated axial section of the housing whereby the first and second U-shaped axial portions are disposed in fluid communication.

The method may include a step of providing a first housing that further includes providing a housing that includes a third generally U-shaped axial portion having first and second axial extremities and an intermediate section and the first and second axial extremities thereof are disposed in normal use at a higher elevation than the first and second axial extremities thereof and the intermediate section may be configured for holding a liquid as well as the second generally U-shaped axial portion may be coupled to the first generally U-shaped axial portion by a second elevated axial section of the housing whereby the first, second and third U-shaped axial portions are disposed in fluid communication. In addition the process may include a step of providing a heat transfer liquid that includes providing a heat transfer liquid that is a paraffinic hydrocarbon and/or combustible heat transfer fluid that possess properties of a low vapor pressure at high operating temperatures.

The method may further include the step of providing vents in the first and second elevated axial sections whereby moisture and volatile organic compounds can escape in the step of providing a biomass includes providing the biomass in a pellet form and the step of depositing heat transfer fluid in the lower elevation of each U-shaped axial portion whereby biomass moving axially through the housing will sequentially move into an out of a pool of heat transfer fluid. The method may also include the step of providing one or more wire mesh enclosures for containing biomass in a pellet form and also include the step of providing a conveyor for serially moving wire mesh enclosures through the axial extent of the housing. All embodiments of the present invention will utilize heat treating the biomass by immersion of the biomass into a heat transfer fluid whereby heat transfer by conduction occurs. The temperature of the heat transfer liquid will ordinarily be in the range of 400 to 480° F. in at least a part of the biomass heat treating process and process may include the step of subjecting the wood fibers to these temperatures in an oxygen free atmosphere for a period of time where an endothermic reaction occurs to convert the wood into torrefied wood. In other cases the temperature range of the liquid may be in the range of 350 to 480° F. in an oxygen free atmosphere for a period of time where an endothermic reaction occurs to convert the wood into torrefied wood.

The step of providing a liquid heat transfer fluid includes providing a liquid heat transfer fluid having vapor pressure that is less than 3 psi at 450° F. although in many cases the liquid heat transfer fluid may have a vapor pressure that is less than 0.073 psi at 450° F.

The invention also includes an article of manufacture that includes a combustible article of manufacture which includes torrefied biomass having a combustible oil entrained therein.

DESCRIPTION OF THE PREFERRED EMBODIMENTS

The present invention utilizes the "renewable" biomass derived from solar energy. The teachings of this invention turn this "renewable" biomass into a new compact, clean burning fuel with a high carbon content that can supplement of replace coal in electric power generating plants. This fuel is referred to herein as torrefied wood products in accordance with the present invention, or enhanced torrefied wood pellets (ETWP) or torrefied wood pellets (TWP). The term TWP, as used herein will be understood to refer not only cube shaped module of biomass that has been torrefied in accordance with the present invention as well as other shapes including modules, comminuted material, pellets, cubes, having ether individual pieces that are either uniform or non-uniform. In some embodiments various procedures for densification of the torrefied biomass will be employed.

This invention includes a method and apparatus to produce a renewable solar energy fuel. Not only can this new fuel be used in co-firing with coal in electric power plants it can also be used as an Energy and Pollution "Off-Set", sometimes referred to as a "Carbon Off-Set" for long term storage. For every ton of carbon in enhanced torrefied wood pellets (ETWP) used, one ton of coal need not be burned, and saves 3.67 tons of net carbon dioxide from entering our air.

The apparatus and method of the present invention will ordinarily utilize energy crops (produced solely for the purpose of providing energy), however, the apparatus and methods of the present invention may also use biomass that would otherwise be left to decay and/or decompose. Ants, termites and microbes generate methane gas from biomass and that is considered one of the main Green House gases.

The apparatus and method of the present invention have many advantages over other carbon reduction methods as mentioned above and with many of the other promising future technologies. For example, the teachings of this invention can immediately result in a reduction in the use of coal just by using enhanced torrefied wood pellets (ETWP) in co-firing with coal in existing electric power plants. Eventually enhanced torrefied wood pellets (ETWP) can replace coal use for electric power generating plants. Enhanced torrefied wood pellets (ETWP) are friable and compatible with existing coal handling and firing equipment in co-firing. This makes this renewable fuel very attractive for all existing coal burning facilities.

Farmers are actively engaged in developing "Energy" crops to produce bio-fuels such as ethanol and bio-diesel. One particular encouraging biomass energy crop is called switchgrass. The central plains of the United States had tens of thousands of acres of switchgrass when the buffalo roamed the United States prairies. Current technologies have already made this an important fuel source with many of the technical problems already solved. Existing technologies exist to harvest, dry and mill the wood biomass material including switchgrass into a densified pellet form for use as a fuel. A great many pellet mills produce millions of tons of wood pellets per year for home heating and stoves. Pellet mills can drastically reduce operating costs and increase efficiently with greater production volumes. Many mills are waiting for an outlet that can utilize this wood based fuel. The major problem with these wood pellets produced is that they tend to absorb moisture and break down quickly. They have to be used quickly and do not store well. They also contain moisture and volatile organic compounds that produce too much smoke and contaminants when burned for most energy applications.

The need for a solution to developing a new processing method that is simple, safe, efficient and practical for major commercial use, has been a driving force leading to the development of this substantial improvement over the prior art. The apparatus and method of the present invention overcomes all the previous problems that prevented torrefied wood from becoming a practical coal replacement fuel.

Finally, a new clean burning, high carbon content, dense friable fuel for immediate use in co-firing with coal and for use as energy and pollution offset can be produced at a fraction of the cost of all prior art methods. This invention can result in the eventual total replacement of coal and save billions of tons of carbon from fossil fuels from entering our air. This in turn can make a significant impact on our quest to reduce the increase in the concentration of carbon dioxide entering the atmosphere.

The increase of coal use in China alone is staggering. They are commissioning about one large coal fired plant per week to keep up with their growing energy needs. The pollution generated in China from these coal fired plants is creating tremendous health problems for all in the path of the contaminants emitted. Millions of people are at risk from breathing the unhealthy air not only in China but here in the United States. Recent air sampling tests in California showed about 25% of the contaminants drifting along the coast originated in China. It is very important for developing nations to take advantage of this clean renewable fuel technology and turn away from coal use for the health and well being of all.

In a preferred embodiment of the invention, pelletized wood is subjected to heat treatment by sequentially moving the wood through respective liquids disposed in axial sections of a tubular body. This immersion heat treatment process utilizing conduction includes submerging and conveying the wood through a high temperature heat transfer fluid within an elongated, serpentine, tubular vessel. The pipeline is shaped to create multiple end abutting U-shaped axial sections in fluid communication. Respective U-shaped axial sections are a pre-heat section, heat treatment section and a cooling section. These respective axial sections are dimensioned and configured to hold a heat transfer fluid. Each of these axial sections is isolated from any axial adjacent axial sections by an elevated axial section that is at a higher elevation than heat transfer fluid disposed in each of the adjacent U-shaped axial sections. The elevated axial sections isolate and create an oxygen free zone on both the inlet and outlet ends of the heat treatment section where heat treatment occurs at high temperature, in the area of 400° F. to 500° F., in order to prevent combustion of the wood. The entire processing system of wood and heat transfer fluid in the pipeline operates at near atmospheric pressure. The temperature of the wood entering and the torrefied wood pellets (TWP) leaving the system is below the combustion temperature of the wood product being treated. The temperature in the heat treatment section and elevated axial sections 13, 15 may be well above combustion temperatures if exposed to oxygen in air.

Utilizing the serpentine body, the steps of the method are: First the three U-shaped serpentine body sections are filled with heat transfer fluid to desired levels well below the peaks of the U-shaped pipeline sections. As the hot heat transfer fluid enters the U-shaped pipeline an equal volume of air, (that contains oxygen) is displaced and exits the ends of the pipeline and the exhaust vent at the tops of the elevated axial sections or vapor chambers 13, 15. As soon as any wood pellets enter the system water vapor in the form of steam is driven out of the wood pellets and displaces the air with oxygen into the vapor chambers and out the exhaust vent port. The steam is inert and does not support combustion. The heat treatment section operates at a high temperature. If the wood pellets or torrefied wood pellets were to be exposed to air with oxygen at the approximately 450 F temperature combustion could occur. The construction of the U-shaped pipeline sections prevents that from occurring.

The vapor chambers constantly receive steam vapor and volatile organic compounds (VOC's) gasses during wood processing. The steam and VOC gasses are constantly exiting the exhaust ports on top of the vapor chambers. The exhaust ports are in fluid communication with the serpentine body and vapor relief ductwork leading to condensers and or heater fuel inlet or stack flares where waste combustible gases are burned. Pressure relief valves (not shown) may also be in the relief ductwork exhaust line to help maintain a stable, very low pressure of several inches of water column above the vapor pressure of the heat transfer fluid in the heat treatment section for better control.

The exhaust steam and VOC gasses may be directed through the exhaust vent pipe to a condenser. This may be air or water cooled using standard existing technology. The steam may be condensed into water and some of the VOC gasses may be captured and condensed into a liquid for other use. The VOC gasses may also be routed to the burner section of the heater and used as a fuel. It has also been common to route the exhaust gasses to a Gas Flare Stack where the gasses are burned.

When wood is heated, at high temperature in the absence of oxygen, for a certain period of time, it gradually turns into torrefied wood. Torrefied wood lacks the moisture and volatile organic compounds (VOC's) and is chemically and structurally different than the wood entering the system. It burns considerably cleaner than wood as almost all the moisture, gasses and undesirable volatile organic compounds have been removed. Torrefied wood has a high percentage of carbon and may be used directly as a fuel or be co-fired with coal in electric power generating plants.

The term "wood" as used herein is intended to comprehend trees, grasses, agricultural waste, sawdust, lumber waste and most other forms of plant material. More particularly, in the preferred form of this invention the biomass described may be an energy crop such as switchgrass. Pellet mills have been increasingly used to convert biomass into a convenient compacted form for transport and use. The average bulk density of collected biomass is 10 to 15 pounds per cubic foot. By using a pellet mill the compacted wood density is increased to 40 pounds per bulk packed cubic foot or more. The density of the pellet may be over 60 pounds per cubic foot. Wood pellets (WP) are the final product of pellet mills and are used for wood stoves, heating, and boilers. The problem with using wood pellets is they still contain significant quantities of moisture, gasses and volatile organic compounds (VOCs) that are released during combustion. In addition, wood pellets (WP) are hydroscopic and very susceptible to degrading due to moisture absorption and cannot be stored for long periods.

This invention includes:

1. A new processing method—an immersion torrefaction process. This process makes use of a heat transfer fluid to heat treat wood by direct "Conduction".

2. A unique equipment configuration—Serpentine body system with elevated axial sections. This allows for continuous product flow through multiple sections at different temperatures, separated by elevated axial sections 13, 15 at near atmospheric pressure.

3. A practical renewable fuel from biomass—torrefied wood (TW) in the form of pellets (TWP). The terms torrefied wood pellets (TWP); enhanced torrefied wood pellets ETWP or torrefied wood products in accordance with the present invention are used herein for all forms of torrefied wood including but not limited to pellets, briquettes, logs, or lumber. The term TWP will be understood to be any compressed torrefied wood, including plant matter, in cube or other form factor.

4. The torrefied wood pellets (TWP) produced in this process may also be enhanced by absorbing part of the heat transfer fluid within the torrefied wood pellets (TWP) The heat transfer fluid (HTF) has a high heat energy content and may increase the torrefied wood pellets (TWP) heat output to over 10,000 Btu/lb. This form may also be referred to as Enhanced TWP or ETWP in this application.

5. Partial torrefaction can also be provided where it is desired to produce a less heat treated form of torrefied wood, at least with certain biomass materials. In such cases the process primarily removes the moisture and volatile organic compounds (VOC's) by using lower heat transfer fluid (HTF) temperatures and or shorter heat treatment time periods.

6. A new practical energy and pollution "offset" product in the form of torrefied wood products in accordance with the present invention to offset carbon use by fossil fuels.

7. A practical method to reduce the added concentration of carbon dioxide in the atmosphere caused by fossil fuels by creating and using torrefied wood. This torrefied wood can co-fire with coal as a fuel for power plants. In addition, torrefied wood (TW) resists decomposition for hundreds of years and can be used as an Energy "offset" when factories want to expand operations. This "offset" feature also allows more time for development of other clean burning renewable energy fuels and other promising technologies.

8. This invention utilizes a "Bootstrap" energy transfer concept that results in an extremely practical and efficient process. Most of the energy gained in the torrefied wood pellets (TWP) cooling section is transferred and used in the wood pre-heat section. In addition heat recovery or pre-heating can be utilized from my previous U.S. Pat. No. 4,539,916 Apparatus for cleaning Flue Gases and other Gases.

In a preferred form of this invention wood pellets (WP) 44 are loaded into wire strainer baskets called capsules 40. The wood containing capsules 40 are loaded by conveyor 61 system into the inlet 11 of the pre-heat 12 section of the system. The horizontal section of the pre-heat section 12 section is full of heat transfer fluid (HTF) 33 at an average temperature of 240° F. to 280° F. The wood 44 is heated from its initial temperature, say 80° F. to 280° F. The pre-heat section 12 drives out most of the moisture and some gases from the wood as the temperature increases above 212 F. (This is a 200° F. sensible heat gain of the wood). The moisture content at approximately 10%, gasses and volatile organic compounds (VOC's) 53 are mostly driven out of the wood in this pre-heat section 12 section. The moisture or water within the wood turns into steam when heated to 212° F. at atmospheric pressure as is this case. Approximately 132 Btu sensible heat and 1,000 Btu of latent heat energy are used to turn one pound of water from 80° F. into steam at 212 F. Therefore, pre-drying the entering wood 44 is important to maintain high efficiency from an energy standpoint but more importantly is the removal of as much moisture from the wood as possible in the pre-heat section so less is mixed with the VOC's in the heat treatment section. This allows for cleaner burning of the VOC's when they are burned.

The capsule 40 with wood pellets (WP) 44 then passes through an elevated axial section 13 that is above the level of the heat transfer fluid (HTF) 33, which separates the pre-heat section 12 from the heat treatment 14 section. The elevated axial section 13 is oxygen free and is a chamber where the moisture vapor and gasses migrate and these drive out the air with oxygen. These vapors exit the elevated axial section 13 by exhaust piping 51 and may be routed to a condenser, after burner and or boiler. The exhaust piping contains a low pressure relief valve that allows for a fairly constant slight positive pressure of several inches water column above the vapor pressure of the heat transfer fluid in the heat treatment section.

Considerable water vapor is continuously being generated in the torrefaction process. The water vapor comes from the entering wet wood as it comes in contact with the heat transfer fluid, in the pre-heat section. Most of the water vapor exits inlet 11. The inlet 11 is at atmospheric pressure because this large inlet is mostly open to the ambient air. The steam and surrounding air is drawn away by an exhaust system. The exhaust at the vapor chambers has a slight pressure build-up of a couple of inches of water, above the vapor pressure of the heat transfer fluid in the heat treatment section, due to the heated gases and heat transfer fluid vapor pressure.

This water vapor would simply exit the inlet 11 and form a fog around the area. An exhaust system with a fan and duct or a hood may be used in some embodiments to capture and remove the water vapor and some of the surrounding air. Hinged covers with exhaust ducts embodiments provide much better exhaust control. All the generated water vapor and surrounding moist air may be simply exhausted out of an elevated stack. Ordinarily, there will be substantially continuous venting through a duct. (If the water was merely dumped to the ambient the entire area would be engulfed in a fog and the system operators would not be able to see.)

The relief valves at the vapor chamber exhaust vents (not shown) may be as simple as a hinged horizontal flapper either having a weight (including any attached weight) corresponding to a pressure slightly above, the vapor pressure of the heat transfer fluid in the heat treatment section.

The moisture content in the exhaust from this elevated axial section 13 is relatively high and the volatile organic compounds (VOCs) concentration is low. The elevated axial section or vapor chamber 13 is dimensioned and configured to allow each capsule 40 to rise above the level of the heat transfer fluid 33.

The wood pellets (WP) 44 are then conveyed by a conveyor system 61 into the heat treatment 14 section where the wood pellets (WP) 44 are heated to 440-480° F. The wood 46 in the wood pellets (WP) 44 continue to take in heat energy, in an endothermic reaction and undergo chemical and structural changes and expel most of the volatile organic compounds (VOC's) 53. The wood 46 is gradually converted into torrefied wood pellets (TWP) 47. The heat transfer fluid 34 may average 440° F.-480° F. in this section. The liquid level of the heat transfer fluid 34 may be several feet higher than the top of the horizontal pipeline 18 to insure that the capsule 42 is submerged during the horizontal travel in this heat treatment 14 section.

The capsule 42 then travels the pipeline 18 incline to another elevated axial section 15 that separates the heat treatment 14 section from the cooling 16 section. The capsule 43 with torrefied wood pellets (TWP) 47 may be above 440-480° F. and, if exposed to air with oxygen, may be combustible and burst into flames. The elevated axial section 15 is "oxygen free" and is a chamber where the moisture vapor and gasses migrate. These vapors 50 exit the elevated axial section 15 via the exhaust piping 51. These exhaust gasses, identified by the reference numeral 52, may be routed to a condenser, afterburner (not shown) and or heater 30. The moisture content in the exhaust from this elevated axial section is very low and the volatile organic compounds (VOC's) concentration is high.

The capsule 43 with torrefied wood pellets (TWP) then enters and travels through the cooling 16 section where the torrefied wood pellets (TWP) 47 are cooled from 480° F. to 280° F. (A 200° F. drop in temperature). The torrefied wood pellets (TWP) temperature only needs to drop below 350° F. to avoid combustion problems when exposed to air. The heat transfer fluid (HTF) 35 in this section is circulated and transferred from the pre-heat 12 section in a "Boot Strap" manner where heat energy is transferred between the heat transfer fluid (HTF) 33 and wood pellets (WP) 44 in the pre-heat section 12 section and between the heat transfer fluid (HTF) 35 and torrefied wood pellets (TWP) 47 in the cooling 16 section. These heat energy values essentially cancel out each other, thereby, help making this a very energy efficient system, except for latent heat and transmission losses. The capsule 43 with torrefied wood pellets (TWP) 47 then travels up the incline pipeline 18 to a point above the heat transfer fluid (HTF) 35 liquid level and excess heat transfer fluid (HTF) 35 is drained from the torrefied wood pellets (TWP) and capsule 43. The torrefied wood pellets (TWP) 47 then exits the system where they are air cooled and allowed to continue draining off any excess heat transfer fluid (HTF) 35.

During this process heat transfer fluid (HTF) 69 is absorbed into the torrefied wood pellets (TWP) 47 and the amount absorbed depends on the type of biomass, time in process, density of pellet and temperature and type of heat transfer fluid (HTF) 20. The HTF used in the preferred embodiment of this invention has a heat content of 19,550 Btu/pound. More specifically, the heat transfer fluid (HTF) is a Paraffinic hydrocarbon made from feedstock or oil. It would be advantageous to use a low cost heat transfer fluid (HTF) made from biomass feedstock with a high energy content and a low vapor pressure at the operating temperature of 400 to 500° F. Oil is commonly used as a fuel with boilers and any absorbed heat transfer fluid (HTF) simple enhances the heat energy content of the torrefied wood pellets (TWP).

The air cooled torrefied wood pellets (TWP) 47 are then conveyed 61 to a central packaging system where the capsules 40 unload the torrefied wood pellets (TWP) 47 contained within the capsules 40. The torrefied wood pellets (TWP) 47 are then packaged for distribution and or distributed in bulk. Examples of bulk distribution include:

1. torrefied wood pellets (TWP) 47 are delivered in bulk form in train cars 65 to electric power plants 67 to be co-fired with coal.

2. torrefied wood pellets (TWP) 47 are delivered to the heater 30 system of this invention to provide virtually all the heat energy necessary to process the wood pellets (WP) 44 into torrefied wood pellets (TWP) 47.

3. torrefied wood pellets (TWP) 47 or torrefied wood logs or torrefied wood products in accordance with the present invention 47 are packaged and delivered to major storage facilities where they are stored for long periods as Energy and Pollution "offset" 68.

Preferred embodiments of the present invention include at least some of the following specific features. The invention relates to methods and apparatus for biomass torrefaction, manufacturing a storable fuel from biomass and producing offsets for the combustion products of fossil fuels and a combustible article of manufacture. The serpentine body 18 with raised elevated axial sections 13, 15 is preferred in the production of torrefied wood pellets (TWP) or torrefied wood products in accordance with the present invention 47 for fuel or long range storage including a carbon Offset 68 for use of fossil fuel.

Direct contact "Conduction" heating between liquid heat transfer fluid (HTF) 20 and wood 44 provides fast and efficient heat treatment of wood into torrefied wood 47. The continuous serpentine body 18 includes multiple U-shaped axial sections in fluid communication with elevated axial sections 13, 15 disposed in between adjacent U-shaped sections. This cooperates with a continuous conveyor 61 system to transport capsules 40 sequentially from the pre-heat section 12, to the heat treatment 14 and then to the cooling section 16).

The preferred apparatus and method utilizes a capsule 40 system for containment of wood pellets, briquettes, logs, composition wood, lumber or other wood forms as it is conveyed through the system. A Conveying 61 system that may utilize cable, continuous chain, track, wheel or rollers moves the Capsules 40 through the Serpentine body 18. Some embodiments include a Heat Recovery Transfer between preheat section 12 and cooling 16 section. This saves energy and helps make system very efficient.

The apparatus and method includes a control for time in the heat treatment 14 section and precise temperature control due to use of a liquid heat transfer fluid 20 instead of steam or inert gas as typically used in the prior art. The present apparatus and method permit the use of an extremely simple system, equipment, controls and operation that is also extremely efficient, 90% to 95% plus effectiveness of energy production. The system in accordance with the present invention is practical for a wide size range including small, medium, large, and super large torrefaction wood pellet 47 systems. The system is also ideal for multiple independent systems with a common header. This allows for standby and for processing different wood 44 products at the same time. The system utilizes a unique raised serpentine body 18 with elevated axial sections 13,15 above the heat transfer fluid (HTF) 20 level, to eliminate the need for an expensive "oxygen free" gas supply system. The system utilizes a continuous process that may be operated 24/7 as opposed to much less efficient batch systems. More particularly, this continuous operation may be attained with only a modest manpower requirement. The present invention cuts manufacturing time for producing torrefied wood by up to 80% over prior art methods.

The wood 44 utilized in the system may be trees, prunings, grasses including switchgrass, waste wood, composition wood, lumber, agricultural waste and wood biomass of almost any type. (Thus, the term "wood" as used herein includes all biomass including but not limited to both traditional woody materials as well as herbaceous plant matter.) It is preferred that the overall carbon element content of the wood be 50% or more in most applications. The wood cells contain cellulose, sugars, water, gasses, volatile organic compounds (VOC's) and other digestible materials found in biomass. The untreated wood cells are hydrophilic (absorb water) and could be consumed by insects or microbes if left to natural decomposition. Since collected biomass may only weigh 10# to 15# per cubic foot bulk weight, it is now becoming an industry wide standard to compact or densify it to make transport and handling more practical. Collected biomass 62 is commonly collected and delivered to a pellet mill 63 where it is densified 3 or 4 times and pressed into mainly pellets or other solid forms. The final wood pellets (WP) 44 density may be 40 pounds per bulk cubic foot. When pressed into logs the density is even higher. However, larger pellets take longer to process than smaller pellets.

The wood pellets (WP) 44 may be formed from most forms of biomass (It will be understood that term "wood" is used herein to include all biomass). The pellets 44 may be manufactured from a biomass 62 such as switchgrass or other wood sources that has been processed through a pellet mill 63 and densified and pressed into pellets. The weight may be 40 pounds per bulk cubic foot. The moisture content may be 5 to 10%. The volatile organic compounds (VOC's) and other gasses may be 10% or more. The carbon content varies with biomass type and environmental conditions. The fuel energy content may be 8,000 Btu/pound but undesirable smoke and volatile organic compounds (VOC's) form during combustion making wood burning an environmental concern that greatly limits its use as a fuel. Being hydrophilic in nature it is very subject to humidity and breaks down quickly as it absorbs water. This speeds up decomposition and requires it to be used quickly after it leaves the pellet mill.

The system for turning wood pellets (WP) 44 into torrefied wood pellets (TWP) 47 in the present system includes subjecting the pellets to immersion in high temperature heat transfer fluid 34 at 440 to 480° F. for approximately 15 minutes. The high temperature energy drives out the unwanted water, gasses, and many volatile organic compounds (VOCs). The high energy intake, endothermic reaction, causes a molecular transformation of the cellulose, sugars and cell content into a hydrophobic friable high carbon based product without the unwanted water, gasses and volatile organic compounds (VOCs). The wood cells have now becoming "torrefied" and the new fuel formed from wood pellets that are called torrefied wood pellets 47 (TWP) herein.

1. Torrefied wood pellets 47 (TWP). This also refers to torrefied briquettes and torrefied logs. This is a partially carbonized form of wood that has very desirable fuel properties. The wood cells are now hydrophobic and repel absorption of water and have no digestible properties, therefore, no danger of decay or natural decomposition by insects or microbes. Like carbonized wood, the life expectancy may be hundreds of years or more. When wood is torrefied it is essentially no longer wood as we know it. It is more like a friable hard plastic like material. The density is increased to about 50 pounds per bulk cubic foot. The pellet material may now have a density of 60 to 70 pounds per cubic foot. Torrefied wood pellets (TWP) 47 is used in this invention description for clarity. However, torrefied wood (TW) or torrefied wood pellets (TWP) may be in other forms and shapes including briquettes, logs or torrefied wood products in accordance with the present invention for use as "offsets.

2. Heat transfer fluid 20 (HTF). A preferred embodiment utilizes a heat transfer fluid having a low vapor pressure. Ideally the vapor pressure is less than 3 psi and ideally less than 0.04 psi. This low pressure enables the construction of apparatus that is less expensive and less substantial because it does not have to function at high pressure. (In other words, the apparatus required does not have to be constructed to sustain high pressures such as that commonly associated with, for example, pressure cookers used for cooking foods. This fluid, characterized by the manufacturer as having a feedstock that is paraffinic hydrocarbon, can be heated to 600° F. and still maintain a very low vapor pressure.

This allows for near atmospheric operation of the entire serpentine body 18 system. This invention may only require a fluid temperature of 450° F. and the vapor pressure would be extremely low at only 0.04 psi. The density of the fluid at 450° F. is approximately 6 pounds per gallon. The fluid heat of combustion is 19,550 Btu/lb. The fluid is nontoxic and can be mixed with other oils. An example of one heat transfer fluid (HTF) 20 that is suitable is "Paratherm HE" that is manufactured by Paratherm Corporation in West Conshohocken, Pa. This fluid is characterized by the manufacturer as having a feedstock that is paraffinic hydrocarbon (single cut). More detail appears in the manufactures publication entitled Paratherm-HE/HEEngBul. Many other plant feedstock, synthetic, or oil based heat transfer fluids (HTF) can be used. A variety of other heat transfer fluids, with similar properties, may also be used. From an environmental standpoint it is preferable that the heat transfer fluid be derived from plants making the HTF 100% renewable energy. (Note: If fossil fuel petroleum (non-renewable energy) is used in making the HTF the TWP would be less than 100% renewable energy by the percentage of carbon in the HTF contained on and in the TWP. An additional consideration is the energy that may be extracted from the final product because of residual heat transfer fluid on and in the final product. In those forms of the present invention where the final product will be utilized as fuel, it is essential that the substance be combustible and has a low vapor pressure at high temperatures. In addition, the selection of the fluid may consider the energy in the fluid because the chosen fluid may be absorbed within and stay on the surface of the torrefied wood produced by the present invention and thus affect the characteristics of the final product.

Each Capsule 40 in the preferred embodiment of the present system is preferably a cylindrical wire mesh basket (or perforated metal) that contains the wood pellets 44 and travels through the serpentine body 18. At least one end is hinged so it may be opened for pellets to be loaded and unloaded. The perforations are smaller than the pellet diameters. In a preferred form of this invention the capsule would be 3' diameter by 6' long. This would hold 40 cubic feet of wood pellets. The wood pellets (WP) 44 weight at 50#/CF would be 2,000 pounds or 1 ton. The capsule may have guide strips to prevent friction wear or contact with the interior of the serpentine body 18. The capsule may be of any size and shape and may contain internal screened areas for increased heat transfer fluid (HTF) flow and escaping gases.

The capsules 40 are moved through the system by a Conveyor 61. A continuous flow cable or chain conveyor transports the capsules 40 through the serpentine body 18. Standard existing conveyor 61 technology would be used. The cable or chain will glide over a metal wear strip (not shown) in case any cable drag occurred. In no case will the cable come in contact with the serpentine body 18 interior. The conveyor 61 cable support system will prevent any wear contact with the interior surface of the serpentine body 18. A mating clamp system may engage and disengage cable during transport.

Figure 7A:
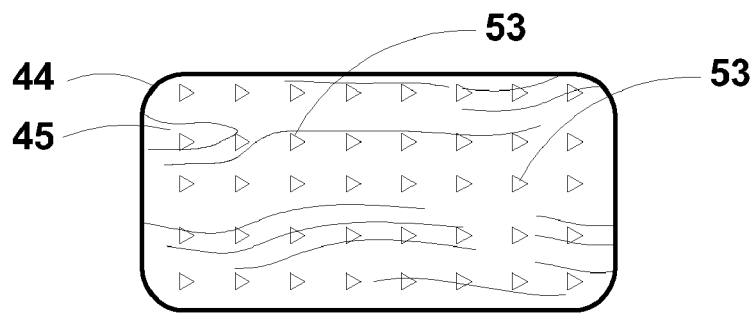
FIG. 7A is a schematic view of wood 44 with moisture, gasses and volatile organic compounds 53 within.
Figure 7B:
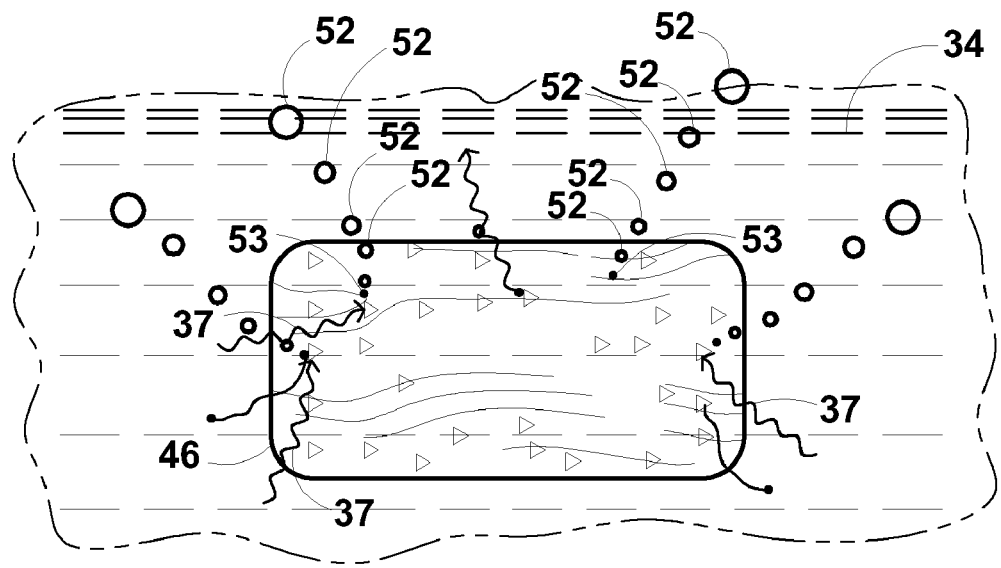
FIG. 7B is a schematic view of wood 44 being treated by the high temperature heat transfer fluid 34 in the heat treatment section 14. Moisture, gasses and volatile organic compounds (VOC's) 53 are shown being driven out of the wood as a gas 52.
Figure 7C:
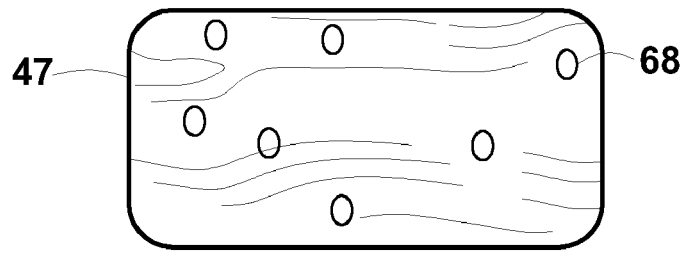
FIG. 7C is a schematic view of the completed torrefied wood 47. Virtually no moisture, and gasses or volatile organic compounds (VOC's) 53 are present. Residual heat transfer fluid (HTF) 69 is shown within the torrefied wood pellets (TWP) 47.

The serpentine body 18 is characterized by U-shaped axial sections. The axial sections are referred to herein as pre-heat section 12, heat treatment section 14 and cooling section 16 sections. Disposed intermediate adjacent U-shaped are elevated axial sections 13, 15 of the serpentine body 18 of this invention. In a preferred form of the invention the serpentine body 18 is a continuous 48" diameter steel pipe with ASME welded joints and covered with exterior insulation and a metal jacket insulation protection covering (not shown). The material specifications of the pipeline may be very similar to the piping used for the Alaskan Pipeline. This pipeline can be of various sizes and shapes and two shapes are preferred as shown on FIGS. 7 and 9. However, almost any size and shape can be used. This size could handle over 1 ton of torrefied wood pellets (TWP)/minute or 60 tons/hr or 1,440 tons/day. Multiple systems may be preferred instead of larger systems due to the readily available 48" diameter steel piping and low cost. The round pipe diameter shape minimizes heat loss and is ideal for the heat transfer fluid (HTF) and capsules 40.

Figure 8:
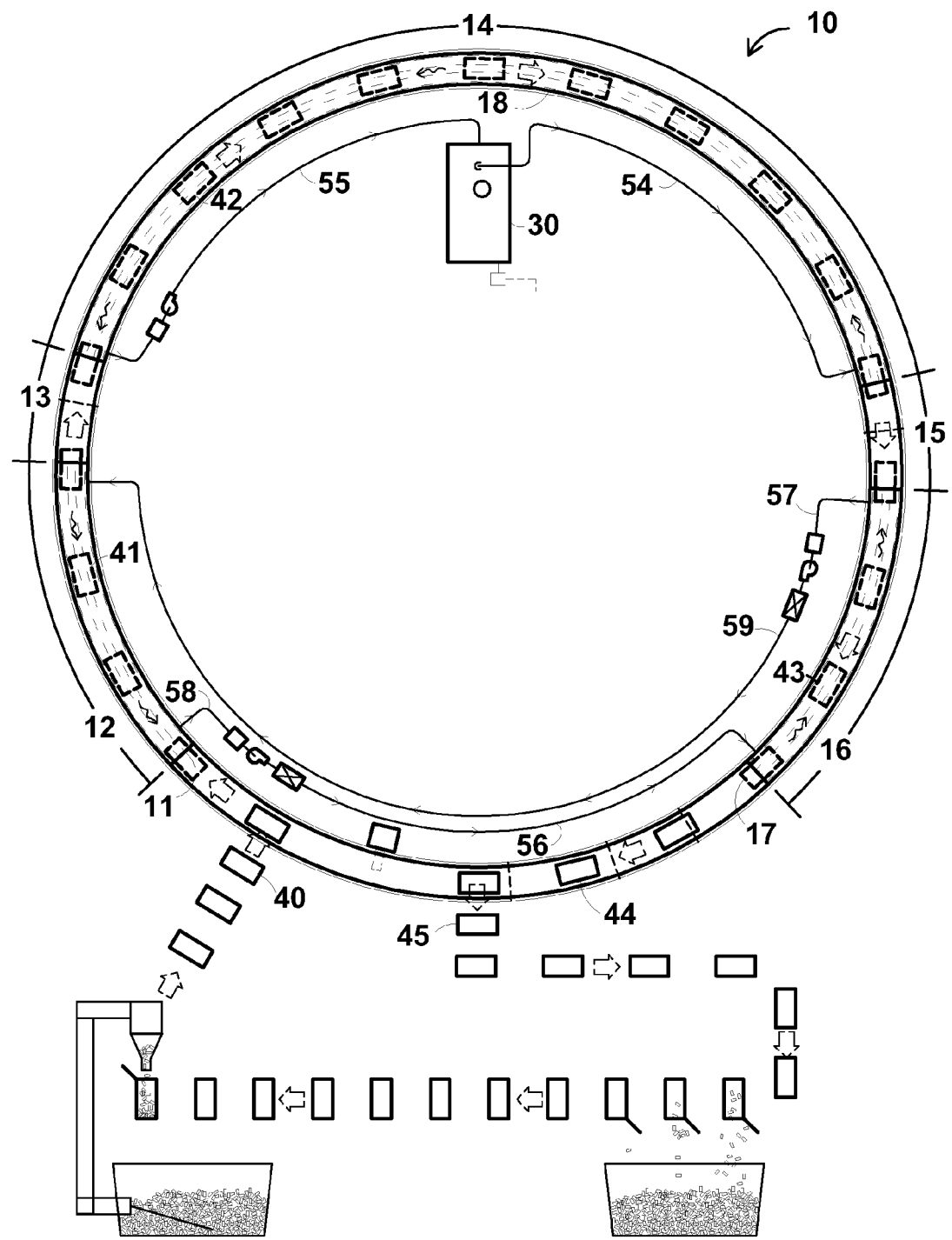
FIG. 8 is a plan schematic view of the serpentine or curvilinear pipeline 18 system in a circular shape embodiment as opposed to the more linear arrangement illustrated in FIGS. 1-3E.
Figure 9:
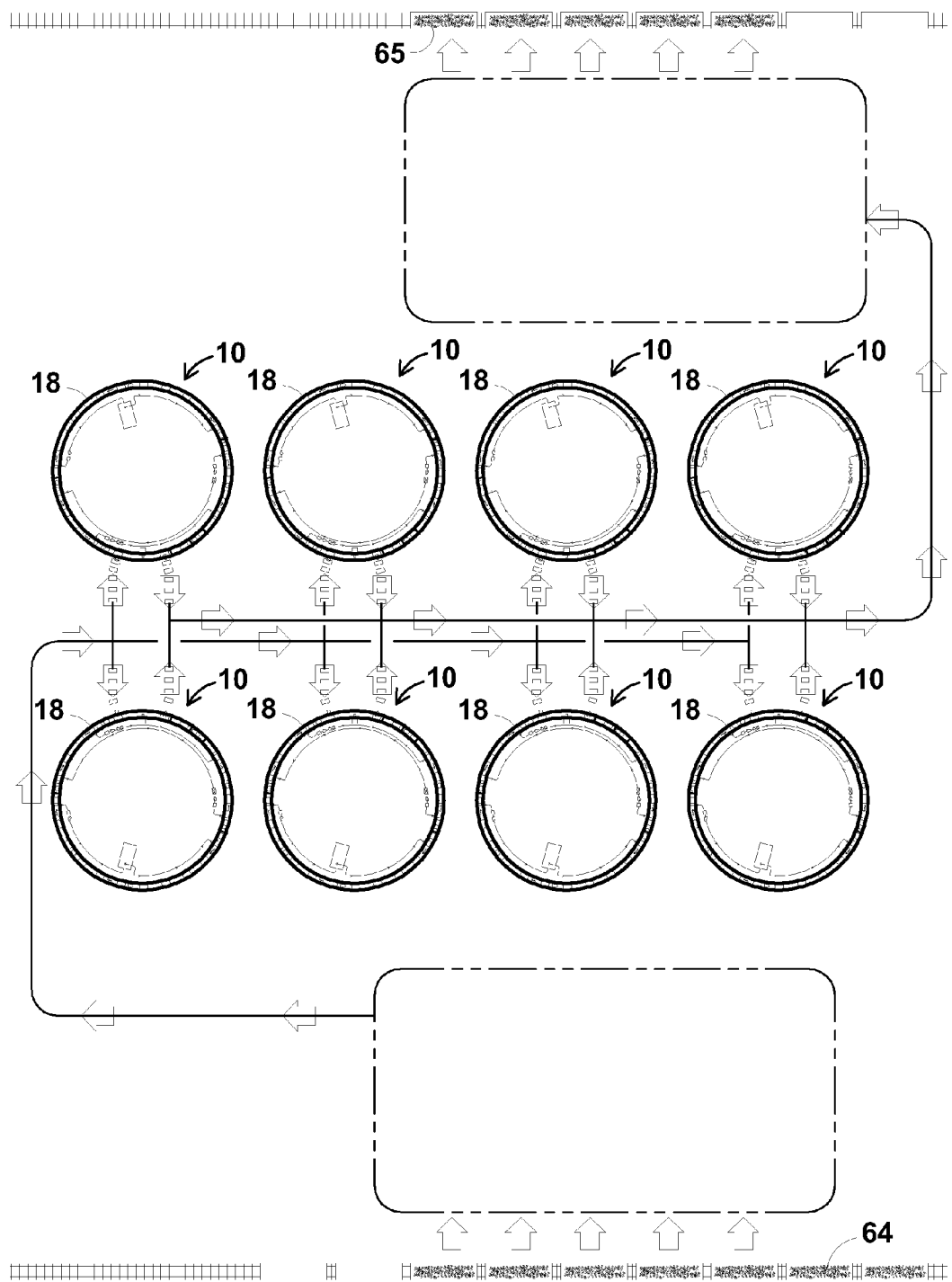
FIG. 9 is a schematic view of multiple circular serpentine body systems 18, as shown in FIG. 8, headered together to produce a much greater quantity of torrefied wood pellets (TWP) 47. An incoming train 64 delivering wood pellets (WP) 44 and a leaving train 65 with finished torrefied wood pellets (TWP) 47 is shown.
Figure 10:
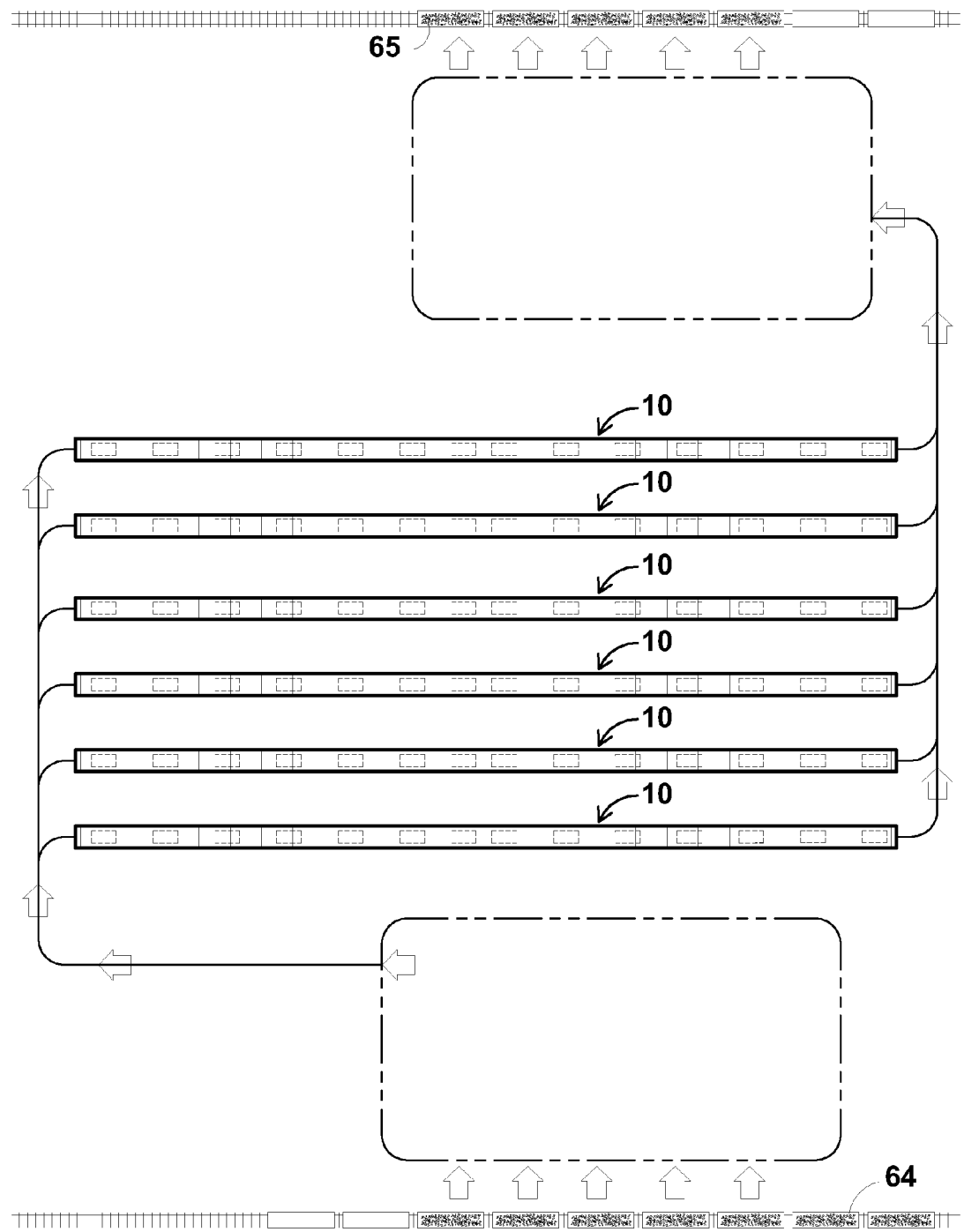
FIG. 10 is a schematic view of multiple straight serpentine bodies 18 joined together by a header to provide increased capacity. The versatile serpentine body system can be of various shapes and sizes. An incoming train 64 delivering wood pellets (WP) 44 and a leaving train 65 with finished torrefied wood pellets (TWP) 47 is shown.

A preferred form of the serpentine body 18 has the axial extremities thereof in abutting relationship with the serpentine body 18 forming a circle, in plan view as shown in FIG. 8. This design allows for a continuous conveyor 61 system to move capsules 40 in a very efficient manner. However, this design uses more land space than the other preferred shape and would be more costly to construct. Other preferred forms of the body 18 utilize a serpentine body 18 wherein the axial extremities of the serpentine body aligned in coaxial relation with a rectilinear axis and substantially all of the serpentine body is either above or below that rectilinear axis. Stated another way, in such an embodiment the serpentine body 18 is a straight line in plan view as shown in FIGS. 9 and 10. This design is more efficient, land space wise, but requires a more extensive conveyor 61 system. This shape may be the least costly to construct. Various combinations of these layouts may be utilized to accommodate the space available.

Figure 2:
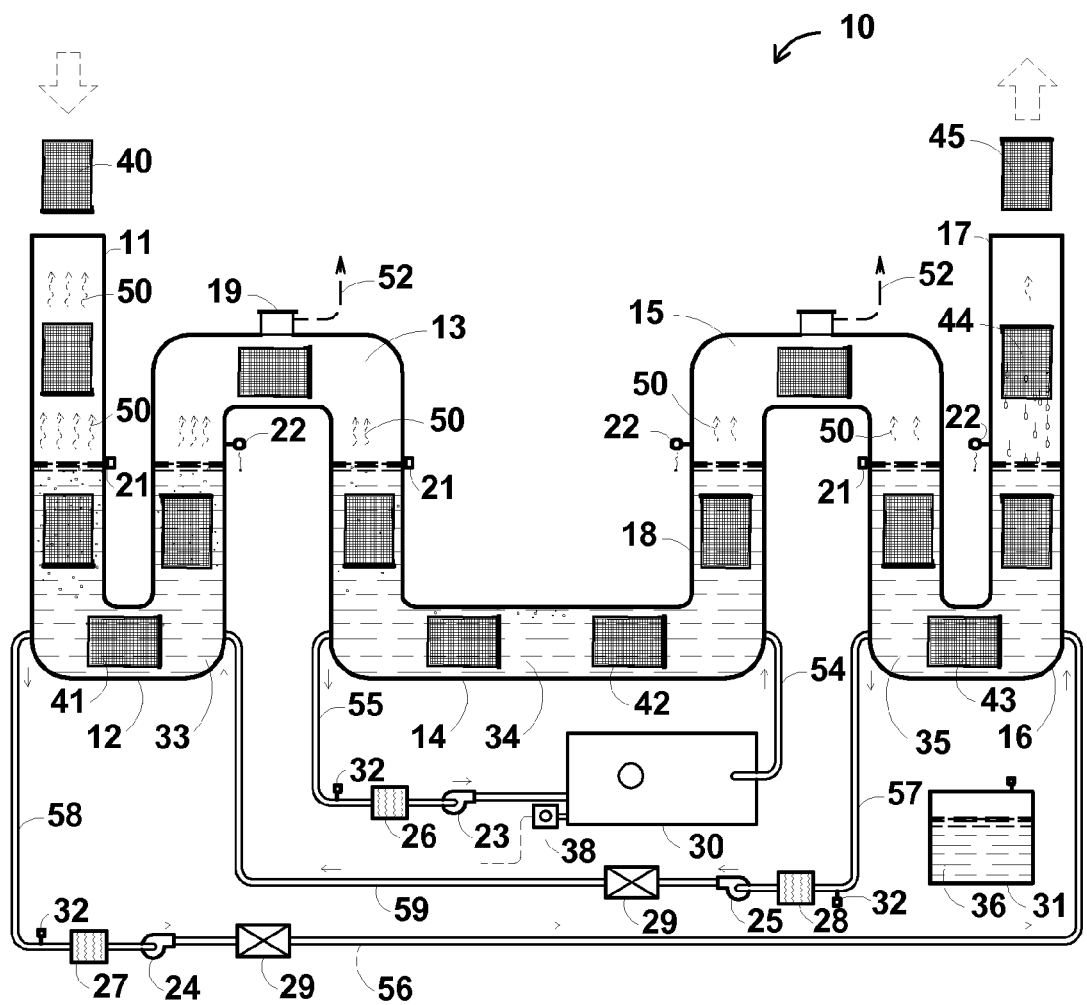
FIG. 2 is a schematic elevation view of one form of the immersion heat treatment system for producing torrefied wood.
Figure 4:
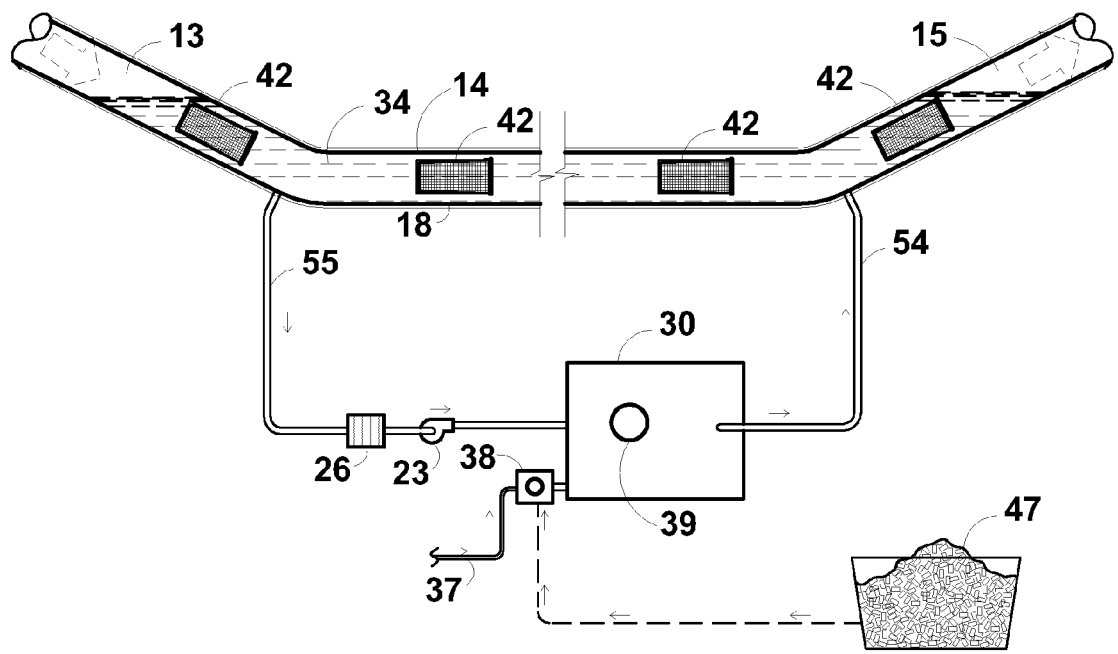
FIG. 4 is a partial schematic view of the heat treatment 14 section and the system heater 30 of heat transfer fluid 34 being circulated in the system.
Figure 5A:
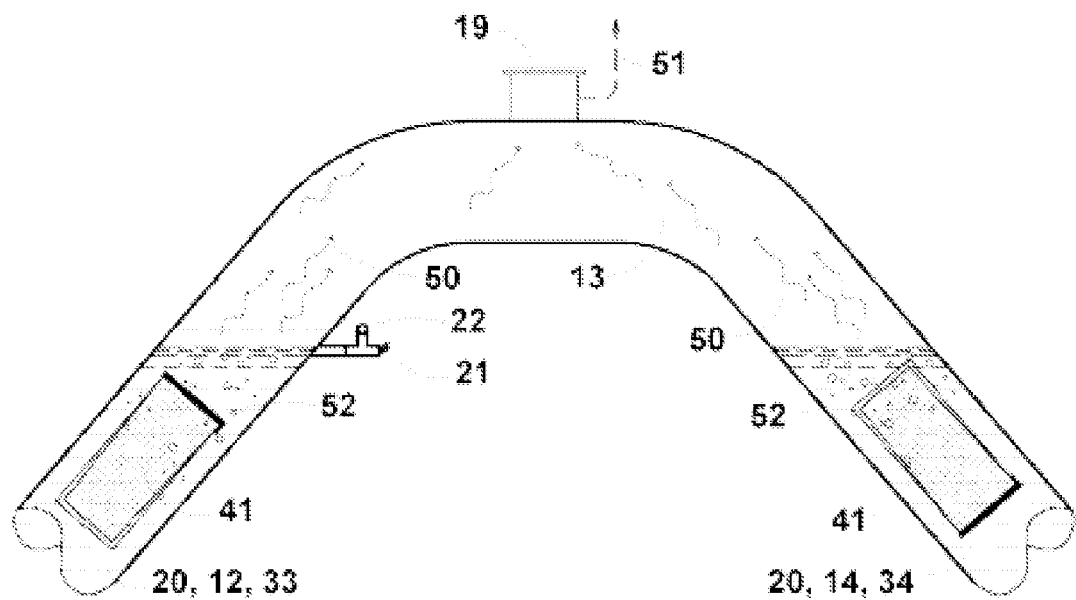
FIG. 5A is an enlarged elevation view of the elevated axial sections 13, 15 with gasses and vapors being vented out exhaust piping 51.
Figure 5B:
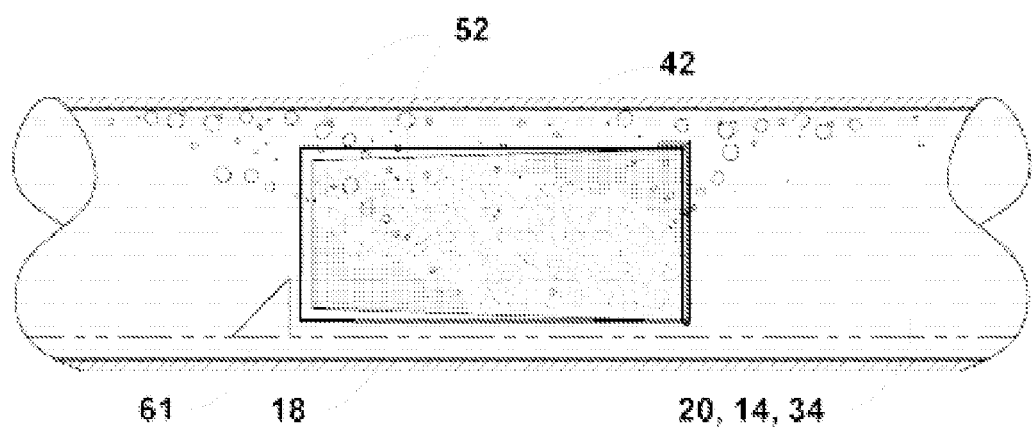
FIG. 5B is a partial section view of the heat treatment section of the serpentine body where a capsule 40 of wood pellets (WP) 44 is being heated with heat transfer fluid 34 and converted to torrefied wood pellets (TWP) 47.
Figure 6A:
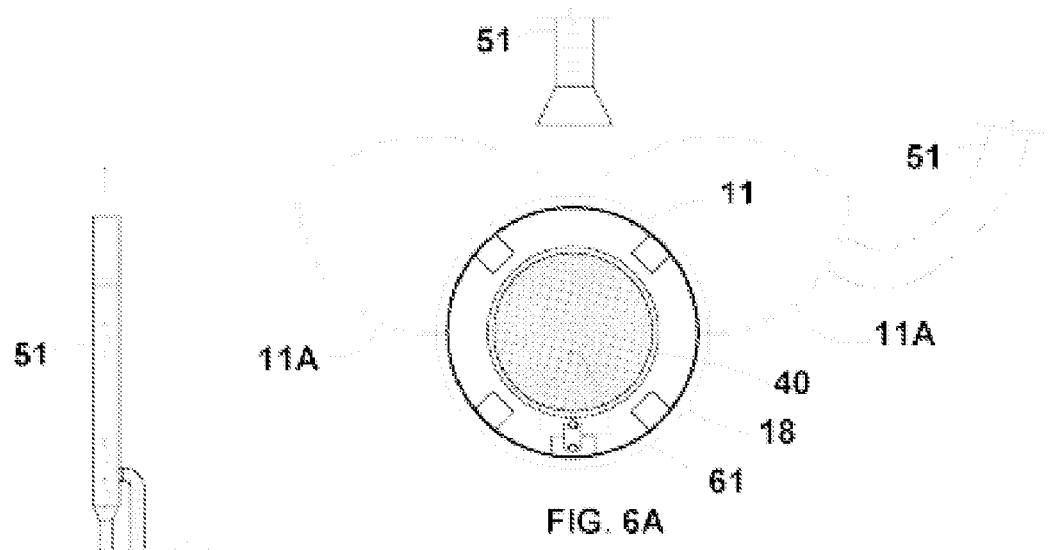
FIG. 6A is an end view of the inlet 11 of the serpentine body showing the capsule 40, conveyor 61, and guides. Hinged covers 11a with exhaust system 51 may be used at the inlet 11 opening between loadings to help capture and remove the large amounts of water vapor generated in the pre-heat section.
Figure 6B:
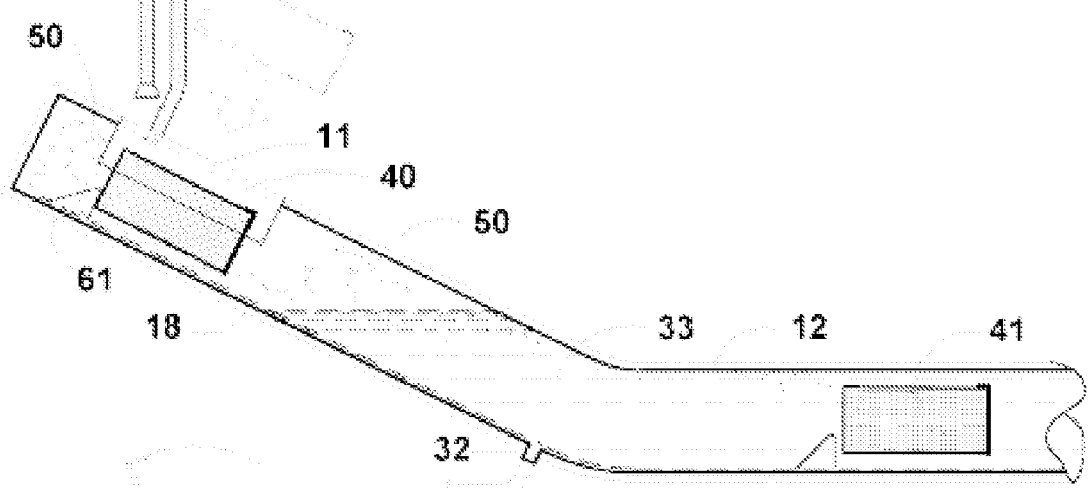
Figure 6C:
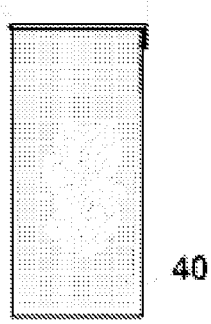
FIG. 6C is a schematic view of the wire basket capsule 40 with hinged opening.

The pre-heat section 12 (P-H Section) is shown in FIG. 2 with the inlet thereof above the heat transfer fluid (HTF) 20 level. The serpentine body 18 then slopes downward to a horizontal position. The horizontal portion of the pipeline is full of heat transfer fluid (HTF) 20 to a point several feet above the top of the horizontal portion to insure total immersion of the wood pellets 44 in heat transfer fluid (HTF) 20. The serpentine body 18 then slopes upward to form an elevated axial section 13 above the level of the heat transfer fluid (HTF) 20. This acts to separate the pre-heat section 12 from the heat treatment section 14. Water vapor, gasses and volatile organic compounds (VOC's) driven out of the wood pellets (WP) 44 migrate along the inside top portion of the pipeline and exit at the open inlet 11 area and the elevated axial section 13. Water vapor will mainly be expelled at the inlet 11 and pre-heat 12 section as the water in the wood quickly turns to steam when heated to 212 F. The heat transfer fluid (HTF) 20 in the pre-heat section 12 section usually varies between 320 and 250° F. or less.

Figure 11:
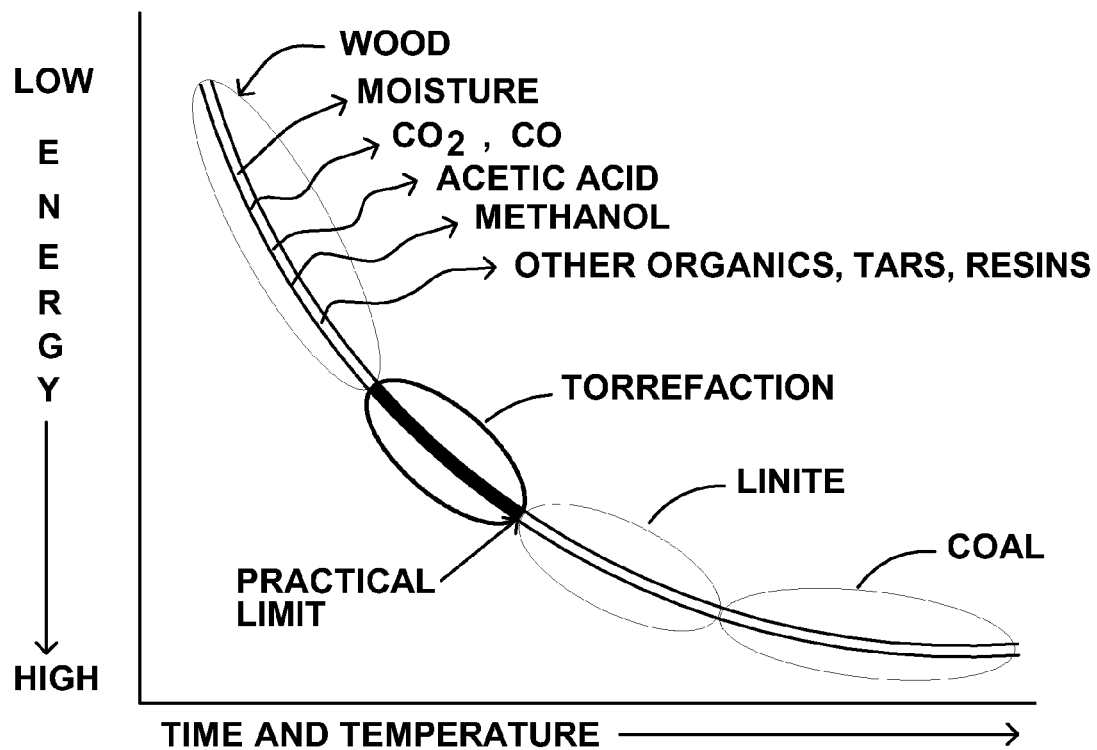
FIG. 11 is a diagrammatic chart of the phases of wood when exposed to "Time and Temperature" along with its relative Energy value. The torrefaction phase occurs as soon as most of the moisture, gases, acids and other organic materials are driven out of the wood during the heat treatment phase. The closer the biomass is converted from wood to charcoal, the more energy is used to drive out the remaining moisture, gases and organics. The most practical energy efficient fuel point is torrefied wood with its high percentage of carbon content and lack of moisture, gasses and volatile organic compounds (VOC's).
Figure 12:
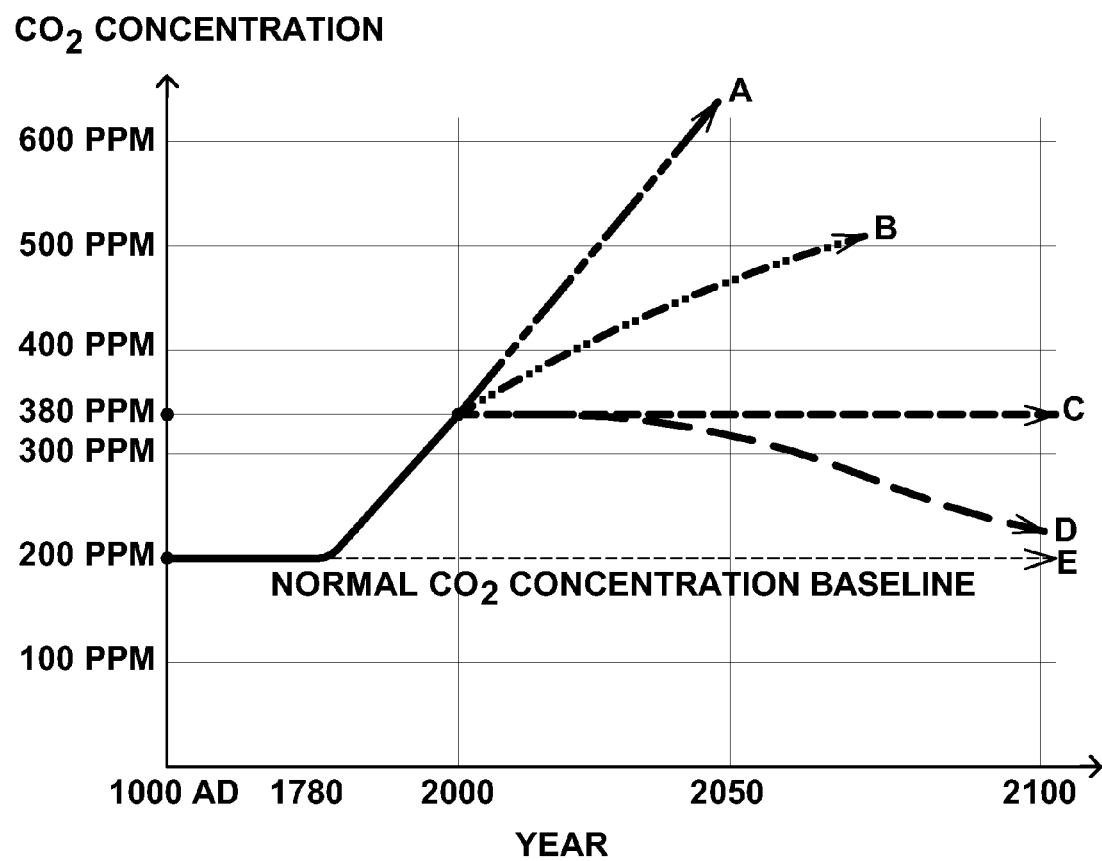
FIG. 12 is a chart of the carbon dioxide concentration in our atmosphere over the last thousand years with a future projection. The curves show the expected carbon dioxide $CO_2$ concentration results based on the following.

The heat treatment section 14 (HT Section) is shown, in FIG. 2, in-between the pre-heat section 12 and cooling section 16. The heat treatment 14 section is where the wood pellets (WP) 44 are converted to torrefied wood 47 (TWP). The direct exposure of the wood to the high temperature heat transfer fluid 34 quickly heats the wood by conduction. The time and temperature vary with size and type of biomass pellet being converted. For example if switchgrass were the biomass milled into wood pellets (WP) 44, the exposure time, for example, will ordinarily be 15 minutes at 480° F. heat transfer fluid (HTF) temperature more or less. Most of the water and gases have been driven out before the wood reached this section. Very complex chemical changes take place during this heat treatment process. The order of gasses being driven out is moisture, carbon dioxide gas, carbon monoxide, and other volatile organic compounds. It is at this point where endothermic reactions and torrefaction occurs and remains until a practical limit is reached as shown in FIG. 11. This limit is determined by tests for each form of biomass. After this practical point is reached more gasification would occur as the torrefied wood is further changed to a form of carbonized wood and that would not be practical. The object of this invention is to treat the wood to within the torrefaction stage.

The wood biomass exposed to the heat transfer fluid (HTF) 34 undergoes a partial low level form of pyrolysis (gasification) where gasses are driven out of the wood. The wood undergoes chemical and structural changes. The result is wood that has a higher percentage of carbon, higher heat content and much less volatile organic compounds than untreated wood. Once the wood approaches the heat transfer fluid (HTF) 34 temperature additional heat energy is still required in an endothermic reaction to complete the transformation process from wood to torrefied wood. During this time in the process very complex and mostly unknown chemical conversion changes occur in the wood material as it become torrefied.

The torrefied wood pellets (TWP) 47 have a heating value that approaches 9,000 to 10,000 Btu per pound as compared to 10,000 to 15,000 Btu per pound for bituminous coal which is the primary fuel for electric power plants. However, even with only ⅔ the energy content of coal the torrefied wood pellets (TWP) 47 produce "Zero" net air pollution because it is considered a "Renewable Energy Fuel", whereas "Non-Renewable" coal produces "100%" air pollution mainly in the form of carbon dioxide and other greenhouse gases. The very good news from limited tests where torrefied wood pellets (TWP) 47 has been used in co-firing with coal, as a combined fuel for power plants, has resulted in much cleaner burning and less harmful air pollution. This combination fuel has had very limited use due to the very high cost, non-uniformity, and scarcity of torrefied wood pellets (TWP) 47. It is the intent of this invention to change this so that torrefied wood pellets (TWP) 47 are inexpensive, uniform, and plentiful and used in a much higher percentage with coal to drive down the added carbon dioxide entering our air from fossil fuel.

The cooling Section 16 will ordinarily receive the hot torrefied wood pellets (TWP) 47 at about 450° F. or less and gradually cool the torrefied wood pellets (TWP) 47 to 250° F. or less. As the cooled torrefied wood pellets (TWP) 47 travel up the inclined/vertical serpentine body 18 the heat transfer fluid (HTF) 20 drains off the torrefied wood pellets (TWP) 47 surfaces and fall back into the horizontal part of the cooling section 16 of the serpentine body 18. The circulating heat transfer fluid (HTF) 20 between the pre-heat section 12 and cooling 16 section exchange heat and conserves considerable energy. This circulation is achieved with the pumps 24, 25. In essence an exact change of energy occurs except for latent heat losses. Ideally, the pre-heat section 12 increases the wood pellets (WP) 44 from 80 to 280° F. or a 200° F. rise.

Then the cooling 16 section cools the torrefied wood pellets (TWP) 47 from 450 to 250° F. or a 200° F. drop in temperature. The 200° F. rise and drop in temperature cancel out the sensible heat input and heat output for very efficient operation. The latent heat used to drive our moisture and gasses is dependent on the moisture content of the entering wood pellets (WP).

The process in accordance with the present invention that converts wood into torrefied wood pellets (TWP) uses heat energy to preheat the wood to drive out moisture. Then the wood is heated to the desired torrefaction temperature. Heat energy drives out additional moisture and volatile organic compounds. In addition, heat energy is consumed by the wood in an endothermic reaction that occurs within the wood cells that alters the molecular structure and chemistry of the wood cells. This endothermic phase transition uses heat energy without raising the temperature of the torrefied wood. In addition, the heat loss from the equipment and exposed piping system surfaces and other losses need to be added to determine the overall efficiency of the process. As compared to all other prior art methods of torrefaction, using steam, air, inert gas, vacuum and superheated steam, this immersion heat transfer fluid invention 10 method uses considerably less energy. Immersion conduction heating puts about a thousand times as many molecules in direct contact with the wood 44 being torrefied than other methods. A fraction of the containment volume is used with heat transfer fluid (HTF) 20 in lieu of other steam or inert gas heat transfer methods. Finally, this invention provides a method of making torrefied wood pellets (TWP) 47 in a manner that is practical, utilizing materials that are plentiful and at very low cost so the method and apparatus may be used extensively everywhere.

The air cool and drain section 17 is shown in FIGS. 3A-3E. After the torrefied wood pellets (TWP) 47 leave the cooling 16 section, the surface temperature may still be 250° F. The torrefied wood pellets (TWP). 47 may be air cooled by natural air movement or by cooling fans. The drained off heat transfer fluid (HTF) 20 is captured in a trough and reclaimed for recycled use.

Filters 26, 27, 28 are shown in FIG. 2: Each of the sections 12, 14, and 16 has a filter system in the return heat transfer fluid (HTF) 20 line. Bits of wood, debris and other contaminants are captured and removed from the heat transfer fluid (HTF) 20 before it reaches the circulating pumps 23, 24, 25. The heat transfer fluid (HTF) circulating pump 24 transfers fluid between the pre-heat section 12 and the cooling section 16. A main pump 23 circulates the high temperature heat transfer fluid (HTF) 34 from the return outlet at the heat treatment section 14 to the heater 30 where it is heated to 480° F. or any other desired temperature.

Each piping section, including the pre-heat section 12, heat transfer section 14 and cooling section 16 has provisions for maintaining the desired level of heat transfer fluid (HTF) 20. A liquid level sensor 21 activates a fill valve from a heat transfer fluid (HTF) 20 storage tank 31 for make-up, if the level is too low. This also maintains a constant level of heat transfer fluid (HTF) 20 in each section of the entire serpentine body 18 system. Many existing technologies exist to maintain liquid level. The fluid level in the pre-heat and cooling sections will be lower than the level in the heat treatment section due to the vapor pressure of the heat transfer fluid in the heat treatment section and the pressure setting of the relief valves in the vapor chamber vent systems.

Each piping section, including pre-heat section 12, heat transfer section 14 and cooling section 16 has provisions for maintaining the desired maximum level of heat transfer fluid (HTF) 20. When the liquid overflow sensor 22 is activated it drains off excess heat transfer fluid (HTF) 20 and directs it to a storage tank 31 for future use. Many existing technologies exist to maintain liquid overflow conditions. The system also includes a heater 30. The heater 30 may be fueled with renewable energy torrefied wood pellets (TWP) fuel to avoid using any fossil fuel.

Coal is the primary fuel used for electric power generation plants and is the main source of man made air pollution in the world. Oil use is the second main source. Natural gas is relatively clean as compared to oil and coal but it also creates carbon dioxide which is a greenhouse gas. Coal has many impurities and heavy metals and many other gases are formed during burning. This application mainly refers to carbon dioxide; however, those skilled in the art will recognize that many other greenhouse gases and other contaminants are produced with coal use.

The present disclosure utilizes several terms of the art. The term "Co-firing" as used herein refers to utility companies mixing a small percentage of wood biomass with coal in the coal firing equipment of a large coal-burning, utility boiler. The term "Greenhouse gasses" refers to emissions produced by the combustion of non renewable fossil fuels such as coal. The advantage of co-firing includes displacing the fossil fuel coal and lowering utility carbon dioxide emissions from fossil fuels. Carbon dioxide emissions from wood and agricultural waste is generally considered "carbon" neutral, that is, it gives up what was taken in during the growth cycle.

As countries try to reduce $CO_2$ emissions, utilities will receive benefits by reducing emission of greenhouse gases resulting from reducing the combustion of fossil fuels and substituting emissions from wood fuel. These $CO_2$ "offsets" are the basis for the benefits granted by a government. Known waste wood and wood pellets fuels contain too high a percentage of moisture and volatile organic compounds for use as an environmentally friendly fuel. This invention converts the wood pellets into dry, torrefied wood pellets that have most of the volatile organic compounds removed. The torrefied wood pellets burn cleanly, approach coal in carbon content and mix easily with coal in existing firing equipment.

Unlike previous wood and wood pellets that were only used in 3 to 8% mix with coal, TWP can be used at 15% or higher. It is expected that TWP can replace coal completely with few modifications to equipment. A goal of this invention is to use torrefied wood pellets and other biomass energy such as bio-diesel in the transporting and processing of the wood and or grasses into torrefied wood pellets in order to reduce the use of any fossil fuels. Bio-diesel may be used as the fuel in the transport vehicles to avoid the use of fossil derived diesel fuel. In addition, bio-diesel electric power generators are increasing in use with hydrocarbon and sulfur emissions essentially eliminated and CO emissions reduced by 50%.

If, for example is took 20 pounds of carbon in biomass fuels to harvest, transport and process 100 pounds of carbon in torrefied wood pellets then it could be considered 80% efficient. However, the net contribution of $CO_2$ emissions would be "zero". That is, 120 pounds of carbon was removed during the plant growth cycle and 120 pounds of carbon would be placed back into the environment when the torrefied wood pellets were used as fuel. One could also say it takes 120 pounds of renewable carbon in biomass to offset 100 pounds of carbon in non-renewable coal. The net result is still 100 pounds of non renewable carbon is prevented from entering our environment.

Wood contains water, cellulose, hemicellulose, lignin and a small proportion of soluble extractives, (lipids and terpenes) and other carbon related compounds. During the overall processing operations virtually all of the water and most of the volatile gases are removed. Most of the moisture is driven out of the wood in the pre-heat section and may be vented or condensed with conventional technology. The volatile organic compounds that are driven out of the wood during the process may be condensed and separated into usable by-products. The volatile organic compounds may also be used as fuel for the heater or burned in stack flares. The volatile organic compounds burn much cleaner without moisture present.

When wood, containing moisture, is burned the formation of a great number of undesirable gases are formed due to the moisture content. This includes smoke with carbon monoxide, methane, nitrogen oxides (NOx) and other smog polluting gases. The cooling smoke and gases form soot, creosote and other toxic substances. This invention removes virtually all moisture within the wood and this allows for much cleaner burning. The torrefied wood pellets formed during this process are moisture free and have reduced Volatile organic compounds and have a very high concentration of carbon.

The biomass that would have been left to decompose into methane and other gases as it gives up the collected suns energy can be processed into useful torrefied wood pellets. The torrefied wood pellets then provides for practical energy use with clean burning emissions and practical offsets for fossil fuel use. This is a win-win-win condition. Numerous other social, economic, environment health and global benefits results from this invention. In essence this invention can help solve the greatest environmental pollution problem since man started using coal and fossil fuels to generate electricity.

Coal mining, extraction, processing and delivery has a side effect that is also environmentally disadvantageous. This process also takes energy and resources and generates pollution before it reaches the electric power generating plant. High quality coal with low sulfur content is becoming scarcer and the future for coal points to lower quality.

With conduction heating, as in this system, lower temperatures or 450° F. or less will result in higher quality, more uniform torrefaction and still process torrefied wood pellets (TWP) faster than prior art methods.

Advantageously, the pellet mill will be close to a TWP processing plant so that it will be practical to use the flue gases from the heater to preheat the wood prior to it being milled into wood pellets. This could be done in accordance to the teachings of John A. Paoluccio's prior U.S. Pat. No. 4,539, 916. Other existing heat transfer technologies such as a stack heat recovery coil may also be used to heat air indirectly for pre-drying the wood.

The description herein refers to a liquid heat transfer fluid. It will be understood that a liquid heat transfer fluid has superior heat transfer characteristics because of conduction. Reference Numerals Used in this Application:

10 Invention. Immersion Heat Transfer Fluid Torrefaction Process.
11 Loading Inlet. Vapor and gases escape as wood pellets (WP) within a capsule are immersed in heat transfer fluid (HTF).
12 Pre-heat Section. wood pellets (WP) are heated by heat transfer fluid (HTF) from 80 to 280° F.
13 Elevated Section or vapor chamber. This separates pre-heat Section from the heat treatment section.
14 heat treatment section. wood pellets (WP) are immersed in heat transfer fluid (HTF) and torrefied.
15 Elevated axial section or vapor chamber. This separates the heat treatment section from cooling Section.
16 Cooling Section. torrefied wood pellets (TWP) are cooled by heat transfer fluid (HTF) from 480° F. to 280° F.
17 Unloading Outlet and Drain Section. heat transfer fluid (HTF) drains off torrefied wood pellets (TWP) in capsule.
18 Serpentine body with Insulation. Note: In the preferred form of the invention this would be a 48" diameter steel pipeline with exterior insulation that would be very similar to the Alaska Pipeline specifications.
19 Access port and hatch to inspect and service system. Prefer 30" diameter access.
20 Heat Transfer Fluid: This fluid allows for "Conduction" heating between the immersed wood and fluid. (Also referred to by reference numerals 33, 34, 35 when disposed in specific sections of the apparatus.)
21 Liquid level sensor. This sends a signal to a float fill valve to maintain desired heat transfer fluid (HTF) level. An indicator alarm may alert the plant operator if heat transfer fluid (HTF) is low.
22 Overflow port. If for any reason the heat transfer fluid (HTF) level rises to this level the overflow fluid will be directed to a storage reservoir. An indicating alarm may alert the plant operator.
23 Circulating Pump. This pump circulates heat transfer fluid (HTF) through heat treatment section and Heater.
24 Circulating Pump. This pump circulates heat transfer fluid (HTF) from pre-heat Section to cooling Section.
25 Circulating Pump. This pump circulates heat transfer fluid (HTF) from pre-heat Section to cooling Section.
26 Filter. This removes particles and contaminants from heat transfer fluid (HTF) in the heat treatment section.
27 Filter. This removes particles and contaminants from heat transfer fluid (HTF) in pre-heat Section.
28 Filter. This removes particles and contaminants from heat transfer fluid (HTF) in cooling Section.
29 Heat Exchanger. These may be used to add heat or remove heat during certain periods.
30 Heater. In Preferred form of the invention this uses torrefied wood pellets (TWP) as fuel to heat heat transfer fluid (HTF).
31 Storage Tanks for heat transfer fluid (HTF) with storage capacity to hold all heat transfer fluid (HTF) during emergency. Source of make-up heat transfer fluid -continued 32. Inlet valve that allows heat transfer fluid heat transfer fluid (HTF) make-up to enter system if sensor detects a low level.
33. Heat transfer fluid HTF in pre-heat section. This may be at 240 to 300° F.
34. Heat transfer fluid HTF in heat treatment section. This may be at 400 to 500° F.
35. Heat transfer fluid HTF in cooling section. This may be at 240 to 300° F.
36. Heat transfer fluid HTF in Storage tanks. These may vary from ambient storage temperature to overflow temperature.
37. Fossil fuel supply to heater or boiler.
38. Co-firing fuel or torrefied wood pellets (TWP) fuel at boiler or heater.
39. Flue gas exhaust. This may include a heat exchanger or may be directed to an Apparatus for Cleaning Flue Gasses and other Gasses per my previous patent number 4,539,916 to preheat biomass prior.
40. Capsule: This is a wire mesh basket and holds the wood pellets (WP) entering the pre-heat Section.
41. Capsule: Wood Pellets (WP) immersed in heat transfer fluid (HTF) in pre-heat Section 12 at 240-280° F.
42. Capsule: Wood Pellets (WP) immersed in heat transfer fluid (HTF) in heat treatment section. Wood is being torrefied @ 440-480° F.
43. Capsule: Wood Pellets (WP) immersed in heat transfer fluid (HTF) in cooling Section. torrefied wood pellets (TWP) are cooled to 280° F.
44. Wood Pellets (WP). This is biomass that has been processed through a pellet mill and densified and pressed into pellets.
45. Wood material in Wood Pellets (WP). This may be any carbon based biomass that contains cellulose, sugars, water, gasses, volatile organic compounds (VOC's) typically found in wood.
46. Wood process in turning wood pellets (WP) into torrefied wood pellets (TWP). Wood is immersed in a heat transfer fluid and undergoes a heat treatment process that changes the structure and composition of wood into a torrefied form.
47. torrefied wood pellets (TWP). This is a form of wood that has been heat treated into torrefied wood. However, torrefied Wood (TW) or torrefied wood pellets (TWP) may be in other forms and shapes including briquettes or fireplace logs or torrefied wood products in accordance with the present invention for use as offsets.
48. Biomass. This includes all forms of biomass such as trees, grasses, waste wood and sawdust and agricultural waste. The preferred form of biomass source for this invention is switchgrass.
49. Switchgrass, or biomass, collected, dried, shredded and turned into compact pellets at a pellet mill.
50. Expelled gasses: Includes water vapor, gasses and volatile organic compounds (VOC's).
51. Exhaust piping of expelled gasses to condenser, boiler and or exhaust.
52. Gasses being expelled from wood pellets (WP) due to immersion in heat transfer fluid (HTF).
53. Liquid, solid and gas forms of water, gasses or volatile organic compounds (VOC's) in wood pellets (WP).
54. Heat transfer fluid (HTF) piping from Heater to heat treatment section.
55. Heat transfer fluid (HTF) piping from heat treatment section to filter, pump and Heater.
56. Heat transfer fluid (HTF) piping from cooling section to filter and transfer pump.
57. Heat transfer fluid (HTF) piping from pre-heating section transfer pump to cooling section.
58. Heat transfer fluid (HTF) piping from pre-heating section to filter and transfer pump.
59. Heat transfer fluid (HTF) piping from pre-heating section transfer pump to cooling section.
60. Heat energy entering wood pellets (WP).
61. Conveyor system.
62. Trees, switchgrass, agricultural waste, waste wood and other biomass.
63. Pellet Mills where biomass is densified into wood pellets.
64. Train cars delivering wood or wood pellets (WP) to processing facility
65. Train cars delivering torrefied wood pellets (TWP) for fuel use or storage as Offsets.
66. Electric power generation plant
67. Carbon dioxide generated from power plants, industry and transportation
68. offset for long range storage
69. Heat transfer fluid (HTF) absorbed within torrefied wood pellets (TWP)

While the present invention has been described in terms of a process that first forms the biomass into pellets followed by heat treatment, those skilled in the art will recognize that the biomass may be formed into pellets after the treatment described herein without departing from the spirit of the present invention. However, it will be understood that the process of forming the biomass into pellets increases the density of the biomass and thereby simplifies the handling of the biomass. In addition, as noted above smaller pellets may be processed more rapidly than larger pellets.

Although the description above contains many specifics, these should not be construed as limiting the scope of the invention, but as merely providing illustrations of some of the presently preferred embodiments of this invention. Thus, the scope of this invention should be determined by the appended claims and their legal equivalents. Therefore, it will be appreciated that the scope of the present invention fully encompasses other embodiments which may become obvious to those skilled in the art, and that the scope of the present invention is accordingly to be limited by the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims.

I claim:

1. A method for biomass torrefaction which comprises:
   providing a quantity of biomass;
   providing a liquid heat transfer fluid;
   providing at least a first housing for holding said liquid heat transfer fluid;
   elevating the temperature of the liquid heat transfer fluid; and
   heat treating the biomass by passing it through the liquid heat transfer fluid in the first housing at a temperature and duration to accomplish torrefaction of the biomass, wherein the liquid heat transfer fluid is substantially all a liquid throughout the elevating and heat treating steps.

2. The method as described in claim 1 further including the step of pelletizing the biomass prior to performing the treating step.

3. The method as described in claim 1 wherein the step of providing a liquid heat transfer fluid includes providing a heat transfer fluid that is combustible whereby residual liquid heat transfer fluid entrained within and on the surface of the biomass increases the energy output available when the treated biomass is burned.

4. The method as described in claim 1 wherein the step providing a liquid heat transfer fluid includes providing a liquid heat transfer fluid that is a paraffinic hydrocarbon.

5. The method as described in claim 1 wherein the step of providing a liquid heat transfer fluid includes providing a liquid that is combustible.

6. The method as described in claim 1 including the step of providing a wire mesh enclosure for containing biomass in a pellet form.

7. The method as described in claim 1 further including the step of subjecting the biomass to temperatures in the range of 400 to 450° F. in an oxygen free atmosphere for a period of time to cause an endothermic reaction to convert the wood into torrefied wood.

8. The method as described in claim 1 wherein the step of providing a liquid heat transfer fluid includes providing a liquid heat transfer fluid having vapor pressure that is less than 3 psi at 450° F.

9. The method as described in claim 1 wherein the step of providing a liquid heat transfer fluid includes providing a liquid heat transfer fluid having vapor pressure that is less than 0.04 psi at 450° F.

10. A method for biomass torrefaction which comprises:
    providing a quantity of biomass;
    providing a liquid heat transfer fluid;
    providing at least a first housing for holding said liquid heat transfer fluid;
    elevating the temperature of the liquid heat transfer fluid;
    heat treating the biomass by passing it through the liquid heat transfer fluid in the first housing at a temperature and duration to accomplish torrefaction of the biomass, wherein the liquid heat transfer fluid is substantially all a liquid throughout the elevating and heat treating steps and wherein the step of providing a first housing includes providing a serpentine elongated first housing that has at least a first generally U-shaped axial portion having first and second axial extremities and an intermediate section, the first and second axial extremities are disposed in normal use at a higher elevation than the intermediate section, and the intermediate section is configured for holding a liquid.

11. The method as described in claim 10 wherein the step of providing a first housing further includes providing a housing that includes a second generally U-shaped axial portion having first and second axial extremities and an intermediate section and the first and second axial extremities thereof are disposed in normal use at a higher elevation than the intermediate section thereof and the intermediate section is configured for holding a liquid and the second generally U-shaped axial portion is coupled to the first generally U-shaped axial portion by a first elevated axial section of said housing whereby said first and second U-shaped axial portions are disposed in fluid communication.

12. The method as described in claim 11 wherein the step of providing a first housing further includes providing a housing that includes a third generally U-shaped axial portion having first and second axial extremities and an intermediate section and the first and second axial extremities thereof are disposed in normal use at a higher elevation than the intermediate section extremities thereof and the intermediate section being configured for holding a liquid as well as the second generally U-shaped axial portion being coupled to the first generally U-shaped axial portion by a second elevated axial section of the housing whereby the first, second and third U-shaped axial portions are disposed in fluid communication.

13. The method as described in claim 10 further including the step of providing vents in the first and second elevated axial sections whereby moisture and volatile organic compounds can escape.

14. The method as described in claim 10 further including the step of depositing liquid heat transfer fluid in the lower elevation of each U-shaped axial portion whereby biomass moving axially through said housing will sequentially move into and out of respective pools of liquid heat transfer fluid.

15. The method as described in claim 10 further including the step of providing a plurality of additional wire mesh enclosures for containing biomass in a pellet form.

16. The method as described in claim 10 further including the step of providing a conveyor for serially moving wire mesh enclosures through the axial extent of the housing.

17. The method as described in claim 10 wherein the step of heat treating the biomass is accomplished by immersion of the biomass into a liquid heat transfer fluid to transfer heat by conduction and entrain some of the liquid heat transfer fluid in the biomass.

18. The method as described in claim 17 wherein the temperature of the liquid heat transfer fluid is in the range of 400 to 480° F. in at least a part of the biomass heat treating process.

19. A method for biomass torrefaction which comprises:
    providing a quantity of biomass;
    providing a liquid heat transfer fluid;
    providing at least a first housing for holding said liquid heat transfer fluid;

elevating the temperature of the liquid heat transfer fluid and maintaining the pressure in the first housing above the vapor pressure of the liquid heat transfer fluid;

heat treating the biomass by passing it through the heat transfer fluid in the first housing at a temperature and duration to accomplish torrefaction of the wood wherein the liquid heat transfer fluid is substantially all a liquid throughout the elevating and heat treating steps.

20. The method as described in claim 19 further including the step of pelletizing the biomass prior to performing the treating step.

21. The method as described in claim 19 wherein the step of providing a liquid heat transfer fluid includes providing a heat transfer fluid that is combustible whereby residual liquid heat transfer fluid entrained within and on the surface of the biomass increases the energy output available when the treated biomass is burned.

22. The method as described in claim 19 wherein the step providing a liquid heat transfer liquid includes providing a heat transfer liquid that is a paraffinic hydrocarbon.

23. The method as described in claim 19 wherein the step of providing a liquid_heat transfer fluid_includes providing a liquid that is combustible.

24. The method as described in claim 19 wherein the step of providing a liquid heat transfer fluid includes providing a liquid heat transfer fluid having vapor pressure that is less than 3 psi at 450° F.

25. The method as described in claim 19 wherein the step of providing a liquid heat transfer fluid includes providing a liquid heat transfer fluid having vapor pressure that is less than 0.04 psi at 450° F.

26. A method for biomass torrefaction which comprises:
providing a quantity of biomass;
providing a liquid heat transfer fluid;
providing at least a first housing for holding said liquid heat transfer fluid;
elevating the temperature of the liquid heat transfer fluid and maintaining the pressure in the first housing above the vapor pressure of the liquid heat transfer fluid;
heat treating the biomass by passing it through the heat transfer fluid in the first housing at a temperature and duration to accomplish torrefaction of the wood wherein the liquid heat transfer fluid is substantially all a liquid throughout the elevating and heat treating steps and wherein the step of providing a first housing includes providing a serpentine elongated first housing that has at least a first generally U-shaped axial portion having first and second axial extremities and an intermediate section, the first and second axial extremities are disposed in normal use at a higher elevation than the intermediate section, and the intermediate section is configured for holding a liquid.

* * * * *